United States Patent [19]

Miyazawa et al.

[11] Patent Number: 5,698,136
[45] Date of Patent: Dec. 16, 1997

[54] LIQUID CRYSTALLINE ALKENYLCYCLOHEXENE DERIVATIVE, LIQUID CRYSTAL COMPOSITION AND LIQUID CRYSTAL DISPLAY ELEMENT

[75] Inventors: Kazutoshi Miyazawa; Shuichi Matsui; Norihisa Hachiya; Etsuo Nakagawa, all of Chiba, Japan

[73] Assignee: Chisso Corporation, Osaka, Japan

[21] Appl. No.: 605,775

[22] Filed: Feb. 22, 1996

[30] Foreign Application Priority Data

Feb. 23, 1995 [JP] Japan ................ HEI 7-59801

[51] Int. Cl.$^6$ ............ C09K 19/06; C09K 19/30; C09K 19/52; C09K 19/12
[52] U.S. Cl. ............ 252/299.6; 252/299.63; 252/299.66; 252/299.01; 568/667; 570/144
[58] Field of Search ............ 252/299.01, 299.6, 252/299.66; 282/299.63; 568/667; 570/144

[56] References Cited

U.S. PATENT DOCUMENTS

| | | | |
|---|---|---|---|
| 5,308,537 | 5/1994 | Coates et al. | 252/299.6 |
| 5,520,846 | 5/1996 | Plach et al. | 252/299.63 |

FOREIGN PATENT DOCUMENTS

| | | |
|---|---|---|
| 61-83136 | 4/1986 | Japan . |
| 8-12605 | 1/1996 | Japan . |

OTHER PUBLICATIONS

Leenhouts et al., "Electro–Optics Of Supertwist Displays; Dependence On Liquid Crystal Material Parameters", Japan Display, Jan. 1986, pp. 388–391.

Schadt et al., "Polar Alkenyls: Physical Properties And Correlations With Molecular Structure Of New Nematic Liquid Crystals", Mol. Cryst. Liq. Cryst., Jan. 1985, vol. 122, pp. 241–260.

Primary Examiner—C. H. Kelly
Attorney, Agent, or Firm—Wenderoth, Lind & Ponack

[57] ABSTRACT

A novel liquid crystalline compound having a high elastic constant ratio, $K_{33}/K_{11}$, a superior compatibility with other liquid crystal compounds, particularly a low temperature compatibility therewith, and chemical stability; a liquid crystal composition containing such a liquid crystalline compound; and a liquid crystal display element, are provided, which liquid crystalline compound is expressed by the formula (1)

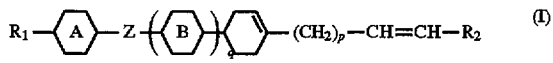

wherein $R_1$ is an alkyl group or an alkyloxy group of 1 to 10C or a halogenated alkyl group, a halogenated alkyloxy group of 1 to 4C, halogen atom or cyano group; $R_2$ is H atom or an alkyl group of 1 to 3C; rings A and B each independently are 1,4-phenylene ring or trans-1,4-cyclohexylene group, which may be substituted by halogen atom; Z is single bond, 1,4-phenylene ring, trans-1,4-cyclohexylene ring or 1,2-ethylene group; p is 2 to 4; and q is 0 or 1.

7 Claims, No Drawings

LIQUID CRYSTALLINE ALKENYLCYCLOHEXENE DERIVATIVE, LIQUID CRYSTAL COMPOSITION AND LIQUID CRYSTAL DISPLAY ELEMENT

BACKGROUND OF THE INVENTION

1. Field of the Invention

This invention relates to a novel liquid crystalline compound having various preferable physical properties, a liquid crystal composition using this novel liquid crystalline compound and having various preferable physical properties and a liquid crystal display element using this liquid crystal composition.

2. Description of the Related Art

Liquid crystal display elements are those utilizing the optical anisotropy and the dielectric anisotropy of liquid crystal compounds, and as the display mode thereof, there have been known twisted nematic mode (TN mode), super-twisted nematic mode (STN mode), dynamic scattering mode (DS mode), guest-host mode (G-H mode), birefringence control mode (ECB mode), etc. Further, as the driving system therefor, there have been known static driving system, multiplex drive system, active matrix driving system, two-frequent driving system, etc.

Properties of the liquid crystalline compounds used for these various liquid crystal display elements and to be provided with, vary depending upon the applications thereof, but any of these liquid crystalline compounds are required to be stable to environmental factors such as moisture, air, heat, light, etc., and also to exhibit liquid crystal phases within a temperature range as broad as possible.

In order to exhibit the optimum characteristics required for the respective display elements, liquid crystal compositions containing a blend of several kinds, and sometime twenty kinds or more of liquid crystalline compounds, are used. Thus, liquid crystalline compounds are required to exhibit superior miscibility thereof with other liquid crystal compounds, and recently, particularly, superior low temperature miscibility in view of the requirement of use under various environments.

In particular, it is required for STN mode compositions to exhibit the steepness of electrooptical characteristics, in order to realize a high image quality. This steepness is a function of the elastic constant ratio ($K_{33}/K_{11}$), and it has been known that compositions using a liquid crystalline compound having a higher constant exhibit steeper electrooptic characteristics (F. Leenhouts et al., Proceedings of the Japan Display, 388 (1986)).

As compounds having a larger elastic constant ratio ($K_{33}/K_{11}$), those having an alkenyl site as shown below have been known. Namely, Mol Cryst. Liq. Cryst., 122(1985), M. Schadt discloses a compound of the formula (10); Japanese patent application laid-open No. Sho 61-83136 discloses a compound of the formula (11); and Japanese patent application No. Hei 6-92740 discloses compounds of the formulas (12) and (13) each having an F atom introduced thereinto:

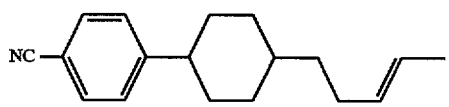

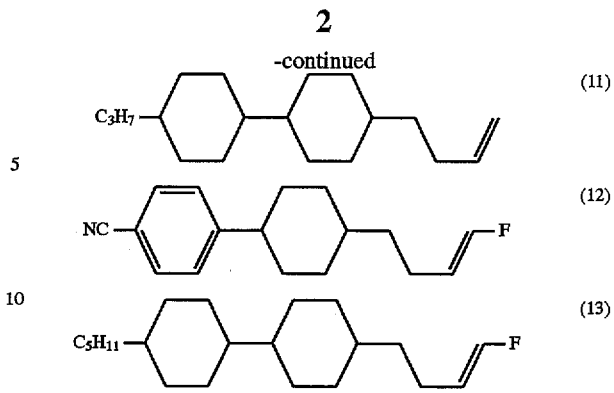

Now, a liquid crystal composition (85 parts by weight) consisting of

| | |
|---|---|
| 4-(4-propylcyclohexyl)benzonitrile | 24% |
| 4-(4-pentylcyclohexyl)benzonitrile | 36% |
| 4-(4-heptylcyclohexyl)benzonitrile | 25% and |
| 4-(4-pentylphenyl)benzonitrile | 15%, | was blended with the respective compounds of the above formulas (10) to (13) (each 15 parts by weight). The elastic constant ratios ($K_{33}/K_{11}$) of these alkenyl compounds are comparatively large as follows:

Compound of the formula (10): 2.28

Compound of the formula (11): 1.78

Compound of the formula (12): 2.28

Compound of the formula (13): 1.98

Any of the liquid crystal compositions using these compounds exhibit a preferred steepness. However, as the display capability of liquid crystal display elements is required to be more improved, a composition having a further steeper electrooptical characteristic, in other words, a liquid crystalline compound having a further larger elastic constant ratio ($K_{33}/K_{11}$), has been desired.

Further, as a compound having a larger elastic constant ratio ($K_{33}/K_{11}$), a compound of a formula (14) having a 1,3-butadienyl group, disclosed in Japanese patent application laid-open No. Hei 5-286873, has also been known.

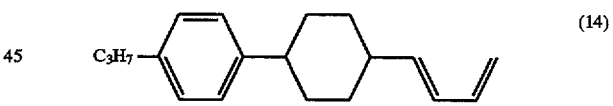

However, since the compound of the formula (14) has a conjugate diene site, it is chemically unstable; hence it is unsuitable as a material for liquid crystal compositions used for practical liquid crystal display elements.

Thus, a liquid crystalline compound having a far larger elastic constant ratio ($K_{33}/K_{11}$), a high chemical stability and a superior miscibility with other liquid crystal compounds has been earnestly awaited.

SUMMARY OF THE INVENTION

The object of the present invention is to provide a novel liquid crystalline compound having a larger elastic constant ratio ($K_{33}/K_{11}$), a superior compatibility with other liquid crystalline compounds, particularly a superior miscibility therewith at low temperatures, and chemical stability; a liquid crystal composition containing such a liquid crystalline compound; and a liquid crystal display element using such a liquid crystal composition.

The present inventors have made a strenuous study in order to accomplish the above objects, and as a result, have found a compound having a novel structure and improved characteristics as compared with known liquid crystalline compounds, and completed the present invention.

The present invention has the following aspects (1) to (7):

(1) A liquid crystalline compound expressed by the formula (1)

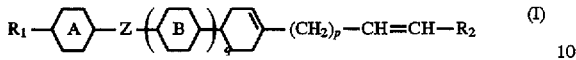

wherein $R_1$ represents an alkyl group or an alkoxy group of 1 to 10 carbon atoms, a halogenated alkyl group or a halogenated alkoxy group of 1 to 4 carbon atoms, a halogen atom or cyano group; $R_2$ represents hydrogen atom or an alkyl group of 1 to 3 carbon atoms; rings A and B each independently represent 1,4-phenylene ring or trans-1,4-cyclohexylene ring wherein hydrogen atom(s) may be replaced by halogen atom(s); Z represents a singlebond, 1,4-phenylene ring, trans-1,4-cyclohexylene ring or 1,2-ethylene group; p represents an integer of 2 to 4; and q represents 0 or 1.

(2) A liquid crystalline compound according to item (1), wherein p represents 2 and $R_2$ represents hydrogen atom.

(3) A liquid crystal composition comprising at least two components which contain at least one member of the liquid crystalline compound expressed by the formula (1) of the item (1).

(4) A liquid crystal composition comprising as a first component, at least one member of the liquid crystalline compound expressed by the formula (1) of the item (1), and as a second component, at least one member selected from the group consisting of compounds expressed by the formulas (2), (3) and (4):

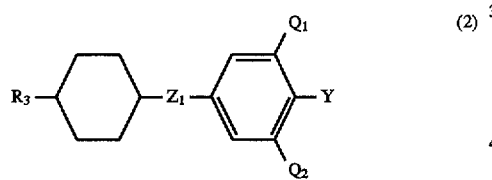

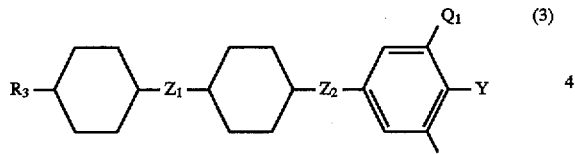

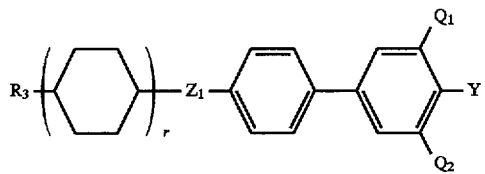

wherein $R_3$ represents an alkyl group of 1 to 10 carbon atoms; Y represents F atom, Cl atom, —$CF_3$, —$OCF_3$— or $OCF_2H$; $Q_1$ and $Q_2$ each independently represent H atom or F atom; r represents 1 or 2; and $Z_1$ and $Z_2$ each independently represent —$CH_2CH_2$— or a single bond.

(5) A liquid crystal composition comprising as a first component, at least one member of the liquid crystalline compound expressed by the formula (1) of the item (1) and as a second component, at least one member selected from the group consisting of compounds expressed by the formulas (5), (6), (7), (8) and (9):

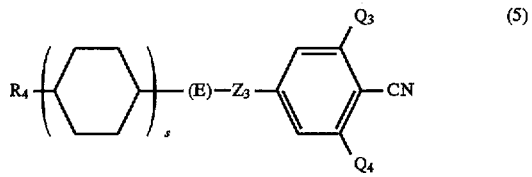

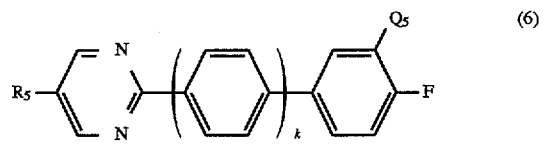

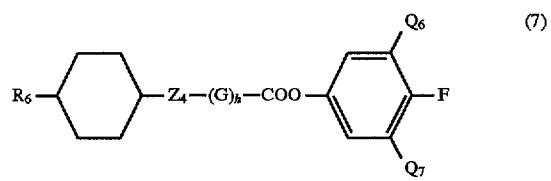

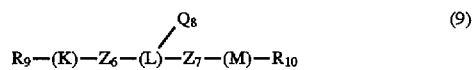

wherein $R_4$ represents an alkyl group of 1 to 10 carbon atoms or an alkenyl group of 2 to 10 carbon atoms, wherein an optional methylene group (—$CH_2$—) may be replaced by O atom (—O—), but two or more methylene groups are not successively replaced by O atom; $Z_3$ represents —$CH_2CH_2$—, —COO— or a single bond; $Q_3$ and $Q_4$ each independently represent H atom or F atom; (E) represents cyclohexane ring, benzene ring or 1,3-dioxane ring; and s represents 0 or 1; $R_5$ represents an alkyl group of 1 to 10 carbon atoms; $Q_5$ represents H atom or F atom, and k represents 0 or 1, $R_6$ represents an alkyl group of 1 to 10 carbon atoms; (G) represents cyclohexane ring or benzene ring; $Q_6$ and $Q_7$ each independently represent H atom or F atom; $Z_4$ represents —COO— or a single bond; h represents 0 or 1; $R_7$ and $R_8$ each independently represent an alkyl group, an alkoxy group or an alkoxymethyl group each of 1 to 10 carbon atoms; (H) represents cyclohexane ring, pyrimidine ring or benzene ring; (J) represents cyclohexane ring or benzene ring; $Z_5$ represents —C≡C—, —COO—, —$CH_2CH_2$— or a single bond; $R_9$ represents an alkyl group or an alkoxy group of 1 to 10 carbon atoms; $R_{10}$ represents an alkyl group, an alkoxy group or an alkoxymethyl group of 1 to 10 carbon atoms; (K) represents cyclohexane ring or pyrimidine ring; (L) and (M) each independently represent cyclohexane ring or benzene ring; $Z_6$ represents —COO—, —$CH_2CH_2$— or a single bond; $Z_7$ represents —C≡C—, —COO— or a single bond; and $Q_8$ represents H atom or F atom.

(6) A liquid crystal display element utilizing a liquid crystalline composition comprising at least two components at least one of which is at least one member of the liquid crystalline compound expressed by the formula (1) set forth in the item (1).

(7) A liquid crystal display element using a liquid crystal composition set forth in any one of the items (3) to (5).

Preferred Embodiments of the Invention

Among the compounds expressed by the formula (1), particularly preferred compounds are those expressed by the formulas (1-a) to (1-j).

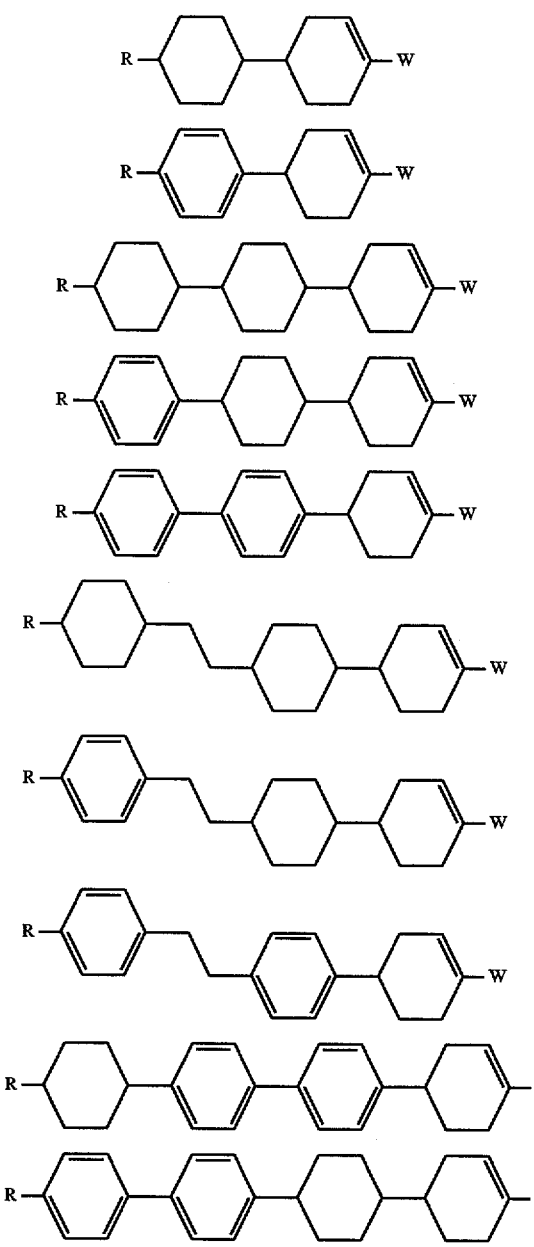

wherein W represents —(CH$_2$)$_p$—CH=CH—R$_2$ and R represents R$_1$, each in the formula (1).

Any of the compounds represented by the above formulas (1-a) to (1-j) exhibit preferred characteristics, and those having a terminal dienyl group of 3-butenyl group, 3-pentenyl group, 3-hexenyl group, 3-heptenyl group, 4-pentenyl group, 4-hexenyl group, 4-heptenyl group, 4-octenyl group, 5-hexenyl group, 5-heptenyl group, 5-octenyl group, 5-nonenyl group, 5-decenyl group, 6-heptenyl group, 6-octenyl group and 7-octenyl group, and among these groups, 3-butenyl group, 3-pentenyl group, 4-pentenyl group, 5-hexenyl group, 5-heptenyl group and 6-heptenyl group are particularly preferred.

Any of the compounds expressed by the formula (1) have a large elastic constant ratio (K$_{33}$/K$_{11}$) and a low viscosity. Further, any of them are non-conjugate diene compounds and are chemically very stable. Furthermore, since the compounds of the formula (1) are low viscosity compounds, the response speed of liquid crystal display elements using the compounds is improved.

Any of the compounds of the present invention exhibit preferred physical properties, and when R$_1$, R$_2$, Z, ring A, ring B and p in the formula (1) are adequately chosen, it is possible to obtain liquid crystal compositions having desired characteristics. For example, when a liquid crystal composition having a wide mesomorphic range is required, compounds of three ring system or four ring system may be used, and when a particularly high liquid crystal temperature range is required, compounds of two ring system or three ring system may be used.

When a composition having a particularly large dielectric anisotropy value is required, a compound having a positive dielectric anisotropy value (p type compound) is usually used, and when a halogen atom, cyano group or a halogenated alkyl group is employed as R$_1$ in the formula (1), it is possible to provide the p type compound. Further, when a large positive dielectric anisotropy value is required, it is possible to achieve the object by introducing a halogen atom into ring A adjacent to R$_1$ group.

In order to obtain a compound having a negative dielectric anisotropy value (N type compound), a group having a nearly neutral dipole moment, for example an alkyl group, may be introduced into R$_1$.

When R$_1$, R$_2$, Z, ring A, ring B and p in the formula (1) are adequately chosen, it is possible to adjust the optical anisotropy value of the liquid crystalline compounds. For example, when a large optical anisotropy value is needed, it is possible to obtain the objective compound by introducing 1,4-phenylene group into either one or both of ring A and ring B, while when a small optical anisotropy value is needed, it is possible to obtain it by introducing trans-1,4-cyclohexylene ring into either one or both of ring A and ring B.

Further, since the compounds expressed by the formula (1) have a low viscosity, the response speed of the liquid crystal display elements using the compounds is improved.

The liquid crystal compositions of the present invention contain at least one member of the compounds expressed by the formula (1) in a ratio of 0.1 to 99.9% by weight. Preferably, the compositions are obtained by blending the first component containing at least one member of the compounds expressed by the formula (1), with the second component containing at least one member of compounds chosen from a group consisting of the compounds expressed by the formulas (2) to (9) in accordance with the object of the liquid crystal compositions.

As the compounds expressed by the formulas (2) to (4), preferably used for the liquid crystal compositions of the present invention, the following compounds can be exemplified:

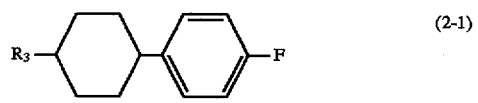

(2-1)

(2-2)

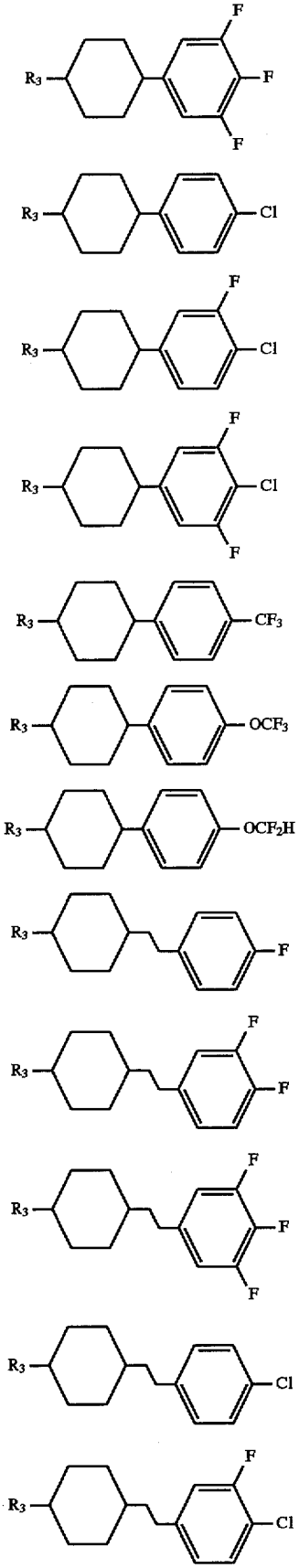
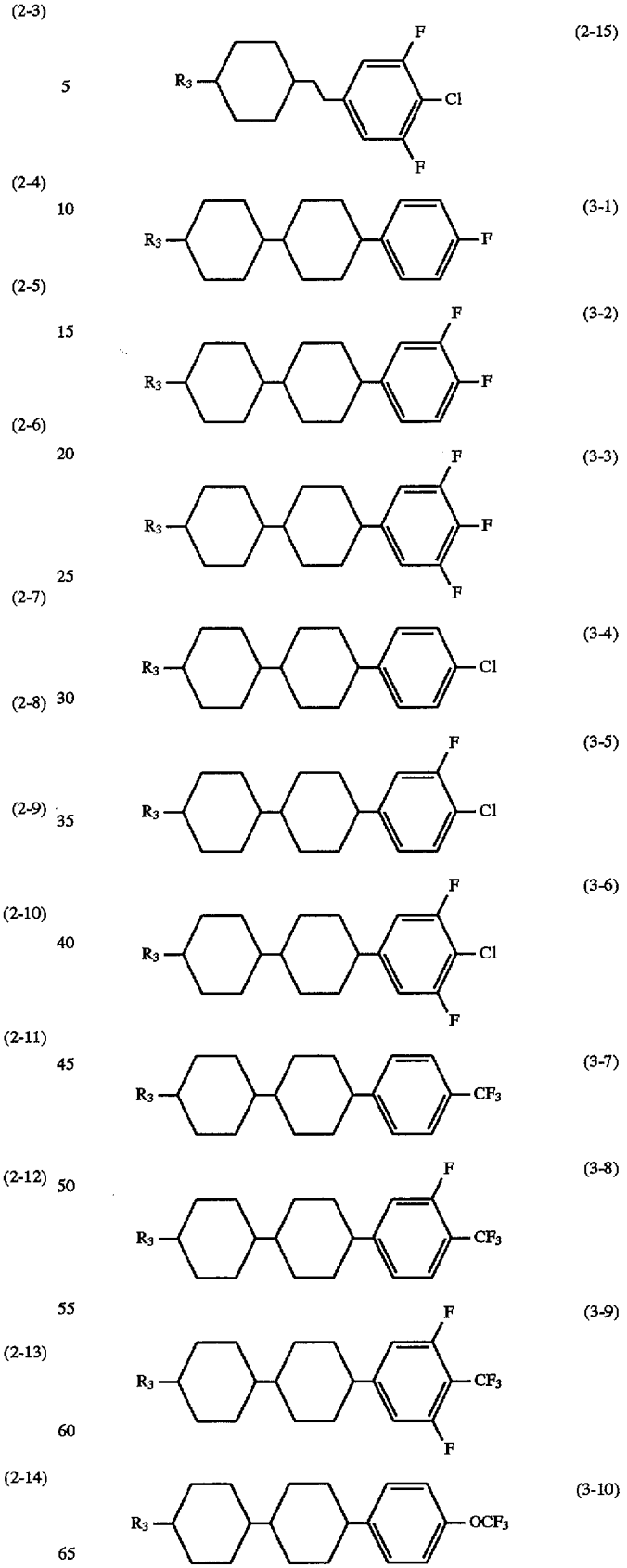

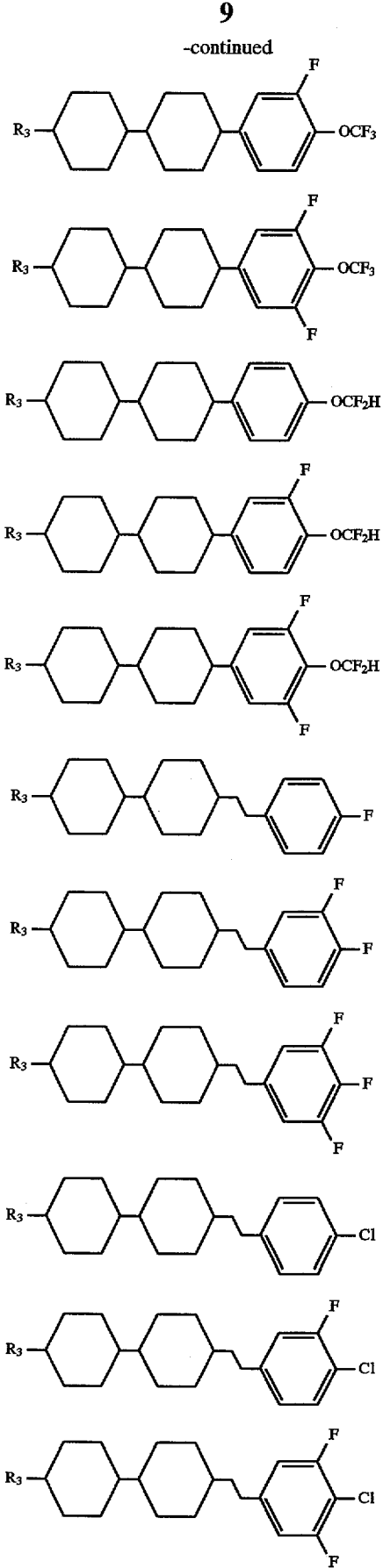

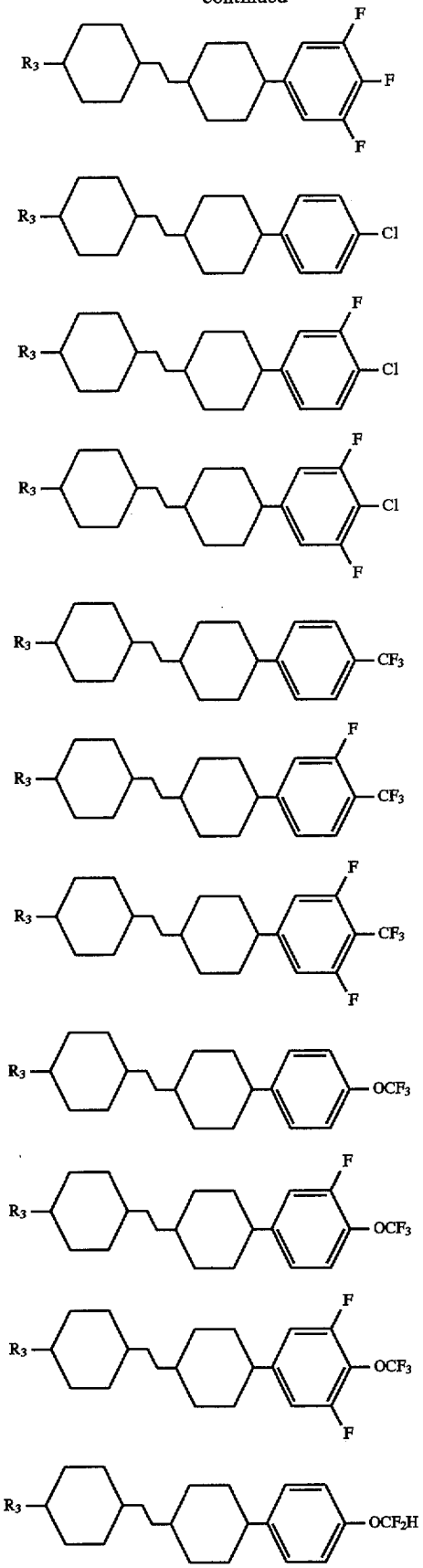
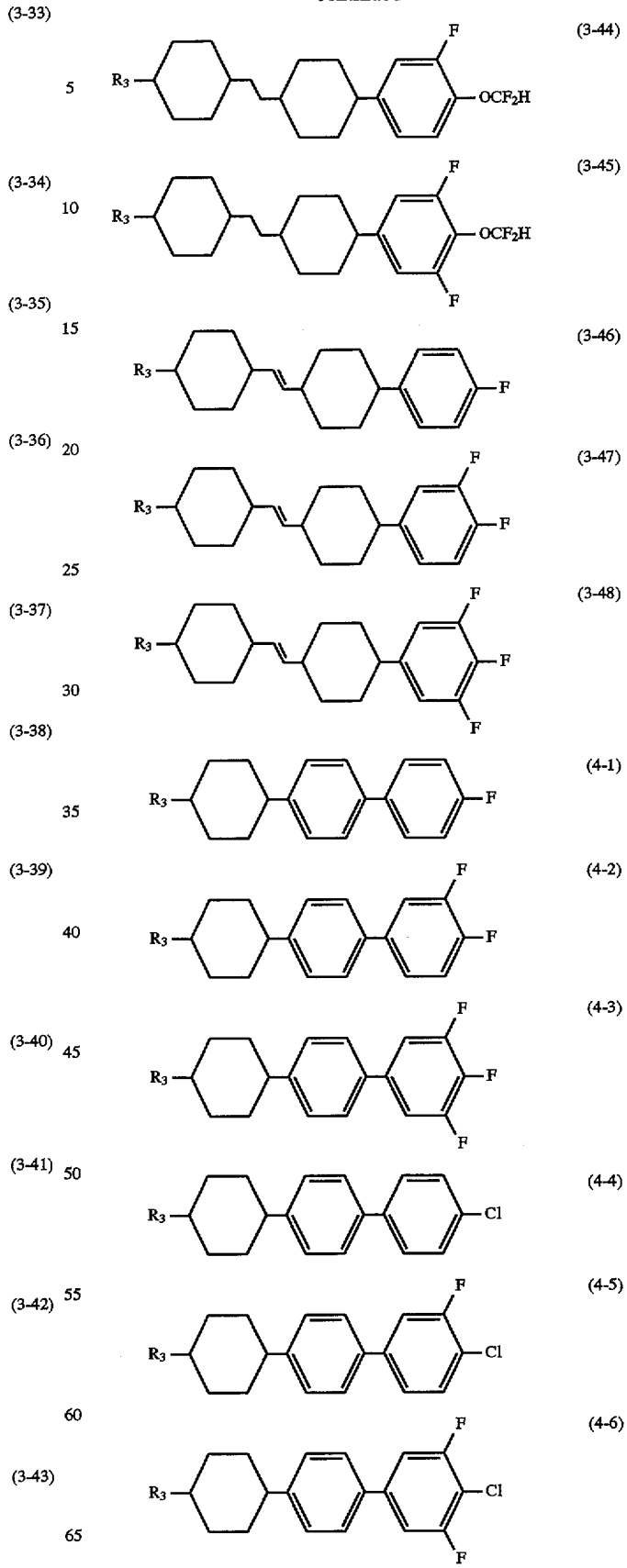

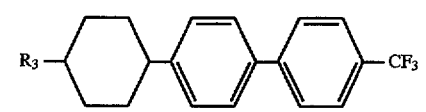 (4-7)
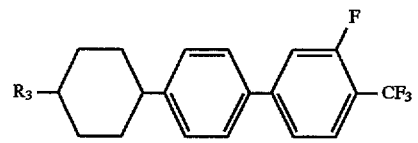 (4-8)
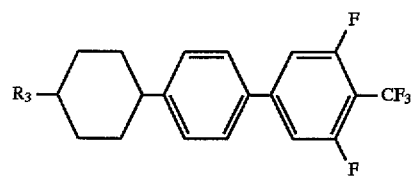 (4-9)
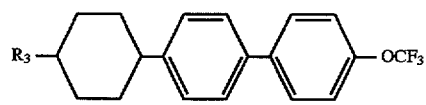 (4-10)
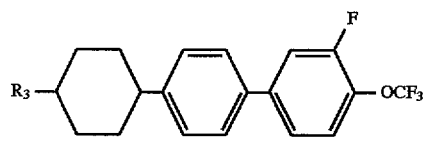 (4-11)
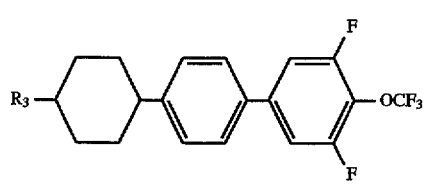 (4-12)
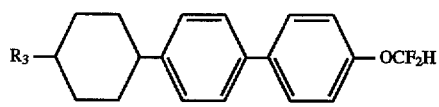 (4-13)
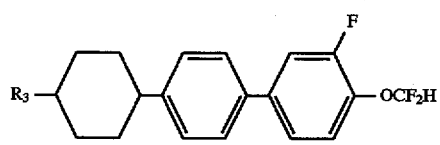 (4-14)
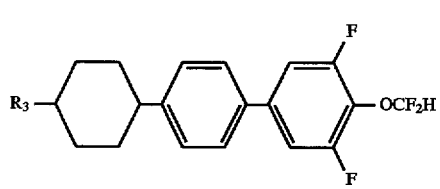 (4-15)
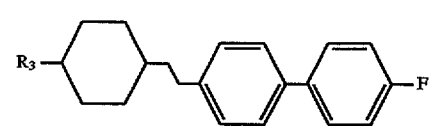 (4-16)
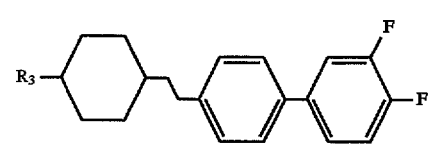 (4-17)
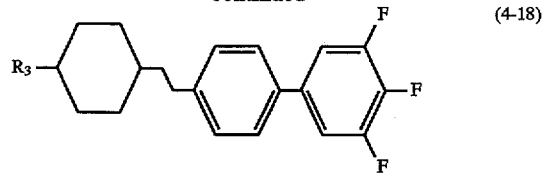 (4-18)
 (4-19)
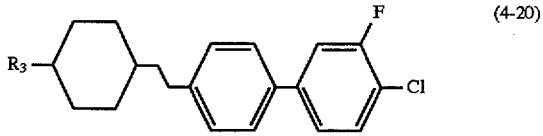 (4-20)
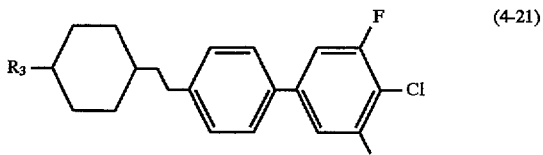 (4-21)
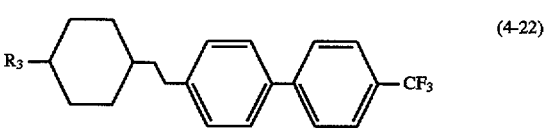 (4-22)
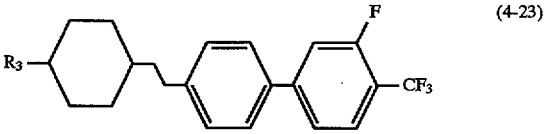 (4-23)
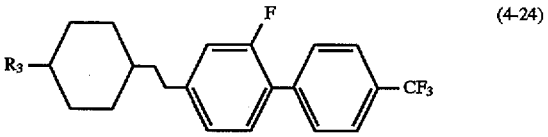 (4-24)
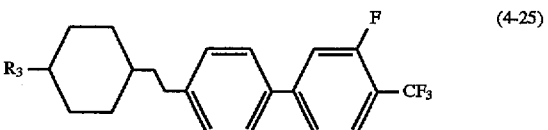 (4-25)
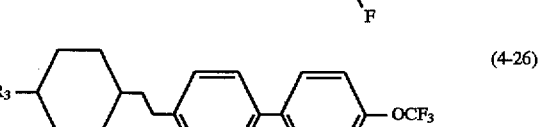 (4-26)
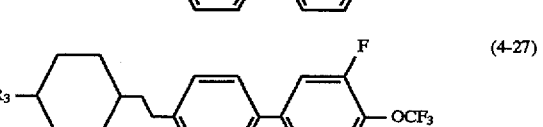 (4-27)
(4-28)

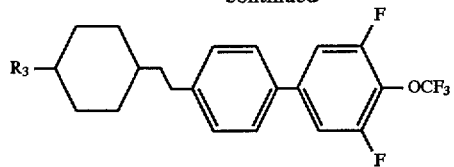 (4-29)

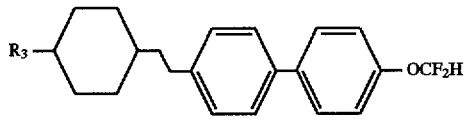 (4-30)

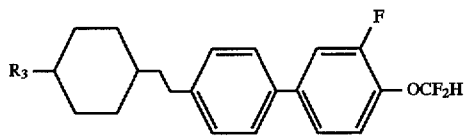 (4-31)

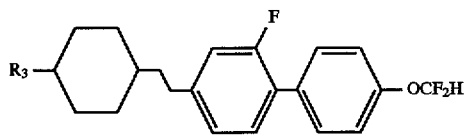 (4-32)

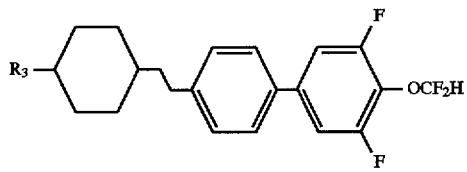 (4-33)

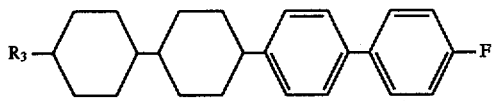 (4-34)

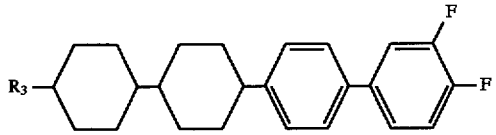 (4-35)

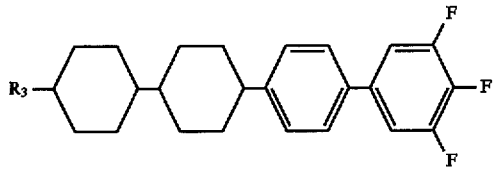 (4-36)

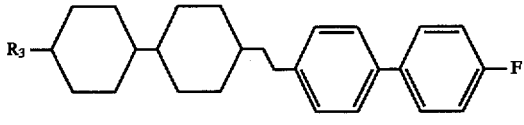 (4-37)

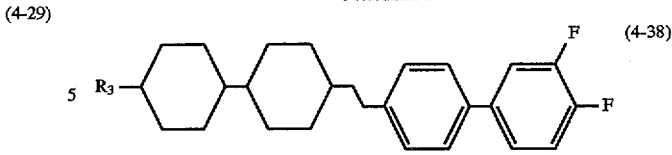 (4-38)

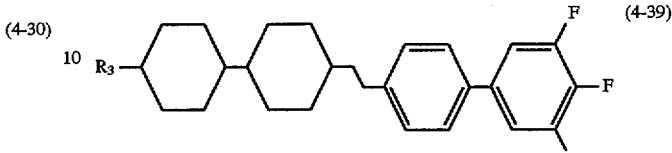 (4-39)

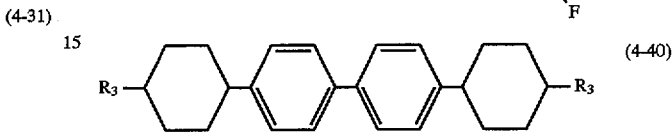 (4-40)

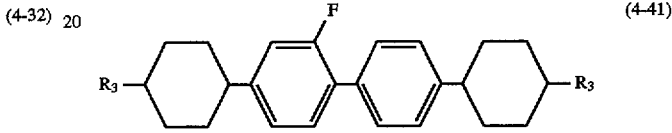 (4-41)

In the above formulas, $R_3$ represents an alkyl group or an ,alkoxy group of 1 to 10 carbon atoms.

Any of the compounds expressed by the formulas (2) to (4) have a positive dielectric anisotropy and a superior thermal stability and chemical stability, and are particularly useful compounds in the case of preparing liquid crystal compositions for TFT (AM-LCD) for which a high reliability directed to a high voltage holding ratio or a high specific resistance value is required.

When the compounds expressed by the formulas (2) to (4) are used for preparing liquid crystal compositions for TFT, the quantity is in the range of 1 to 99% by weight based upon the total weight of the liquid crystal compositions, preferably in the range of 10 to 97% by weight, more preferably in the range of 40 to 95%. With such compounds can be blended compounds expressed by the formulas (5) to (9). When liquid crystal compositions used for STN display mode or TN display mode are prepared, the compounds expressed by the formulas (2) to (4) can be also used.

As the compounds expressed by the formulas (5) to (7), preferably used for the liquid crystal compositions of the present invention, the following compounds can be exemplified:

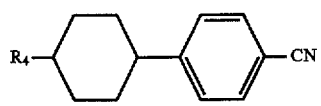 (5-1)

-continued
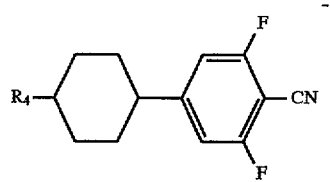
(5-2)
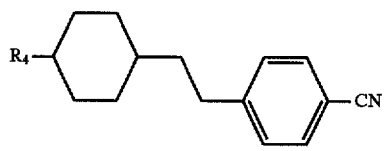
(5-3)
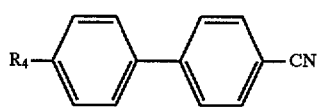
(5-4)
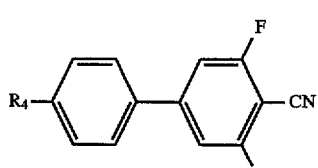
(5-5)
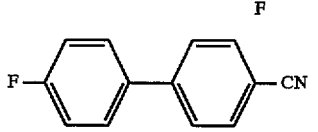
(5-6)
(5-7)
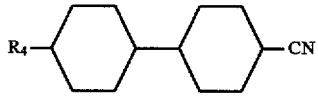
(5-8)
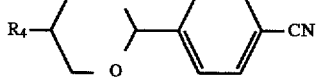
(5-9)
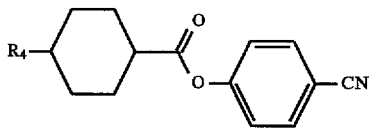
(5-10)
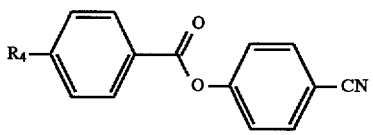
(5-11)
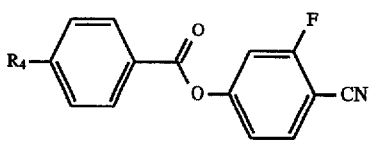
(5-12)
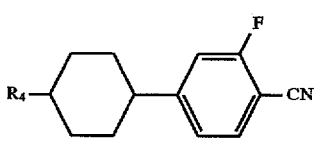
(5-13)
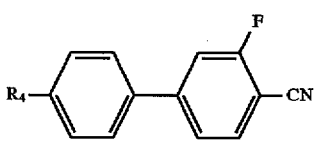

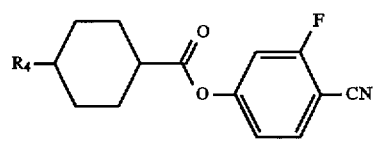 (5-14)
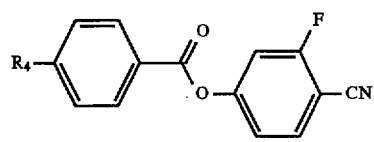 (5-15)
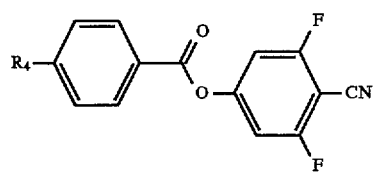 (5-16)
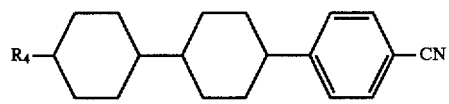 (5-17)
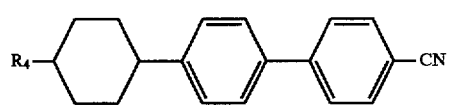 (5-18)
 (5-19)
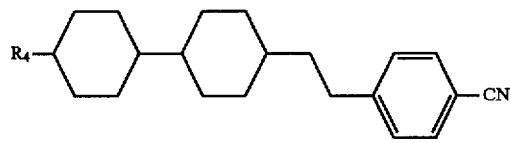 (5-20)
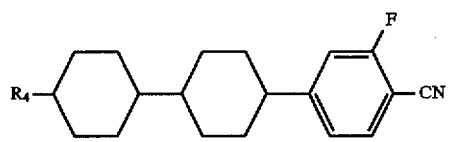 (5-21)
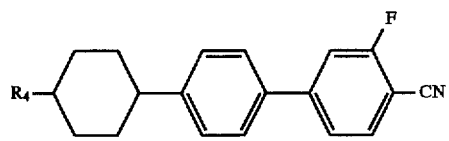 (5-22)
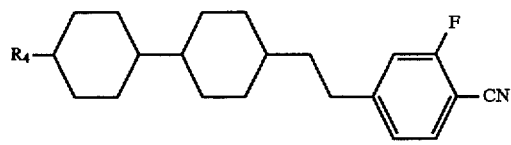 (5-23)
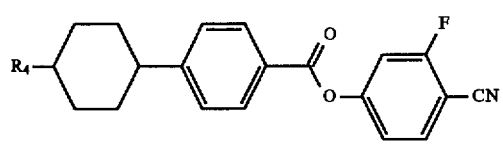 (5-24)

-continued
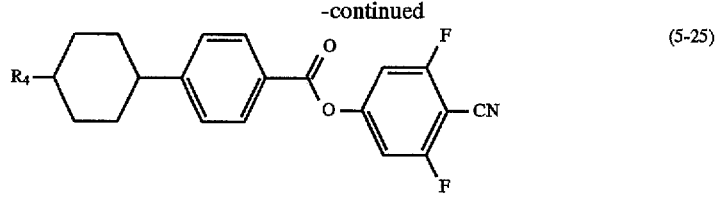 (5-25)
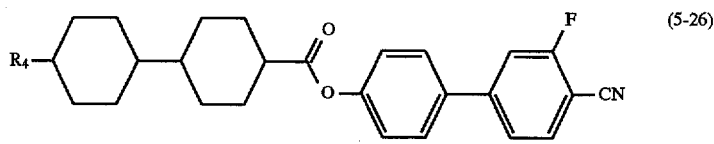 (5-26)
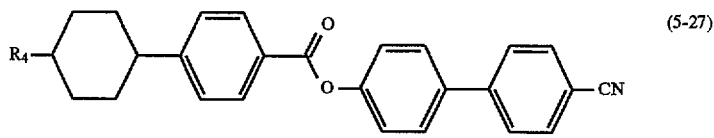 (5-27)
 (6-1)
 (6-2)
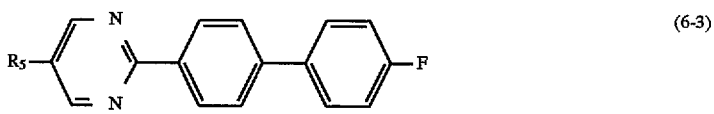 (6-3)
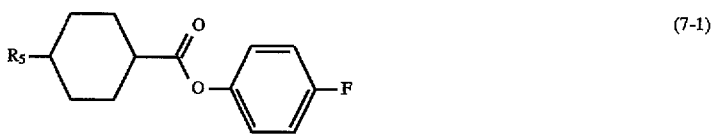 (7-1)
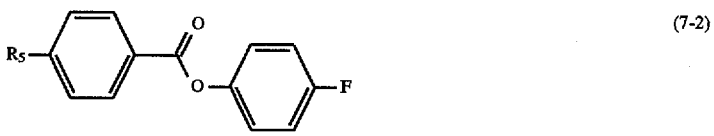 (7-2)
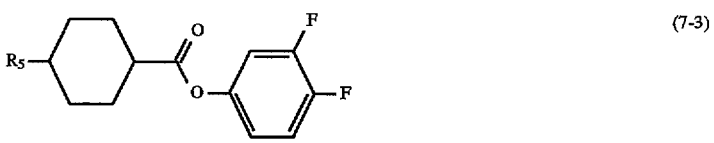 (7-3)
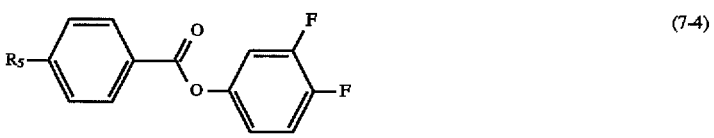 (7-4)
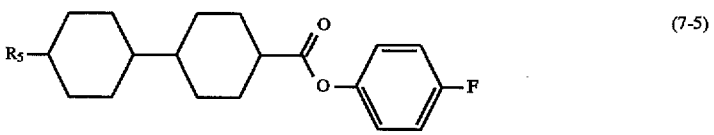 (7-5)

-continued

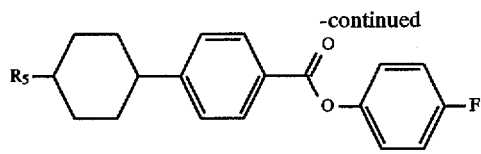 (7-6)

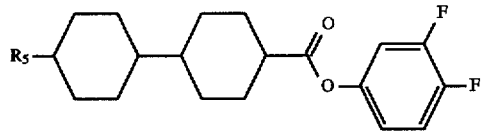 (7-7)

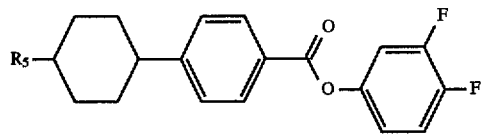 (7-8)

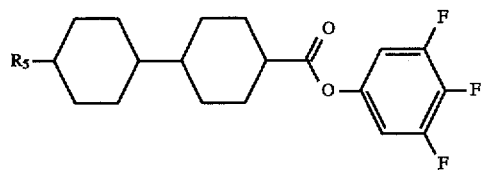 (7-9)

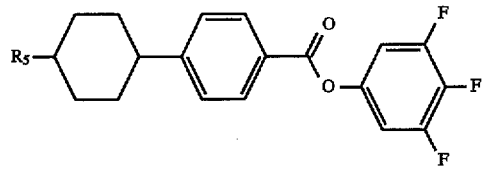 (7-10)

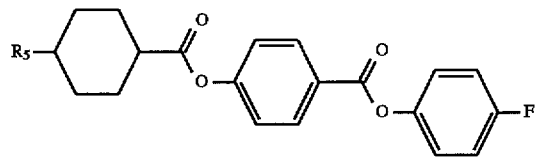 (7-11)

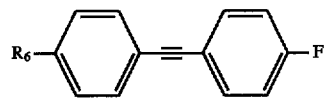 (7-12)

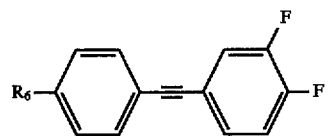 (7-13)

In these formulas, $R_4$ represents an alkyl group of 1 to 10 carbon atoms or an alkenyl group of 2 to 10 carbon atoms, and in either of the groups, an optional methylene group (—$CH_2$—) may be replaced by O atom (—O—), but two or more methylene groups are not successively replaced by O atom, and $R_5$ and $R_6$ each independently represent an alkyl group of 1 to 10 carbon atoms.

Any of the compounds expressed by the formulas (5) to (7) have a large positive dielectric anisotropy value; hence they are particularly useful for reducing the threshold voltage of liquid crystal compositions, and are used for improving other properties such as broadening the nematic range, viscosity adjustment, adjustment of optical anisotropy value, elevating the clearing point, etc. and also for improving the steepness of electrooptic characteristic.

As the compounds preferably used for the liquid crystal compositions of the present invention and expressed by the formulas (8) and (9), the following compounds can be exemplified:

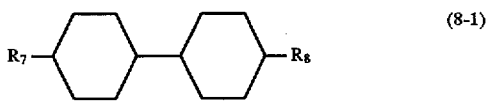 (8-1)

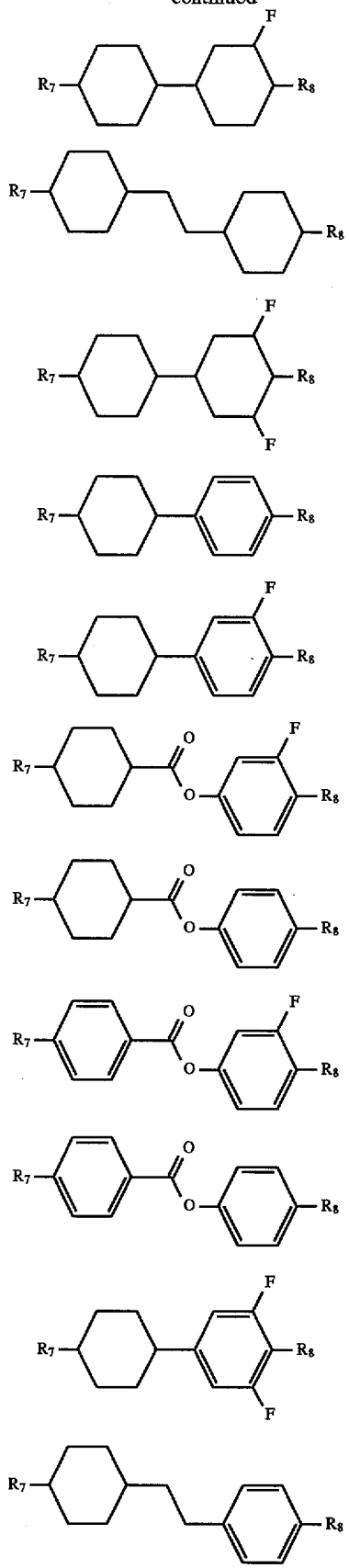
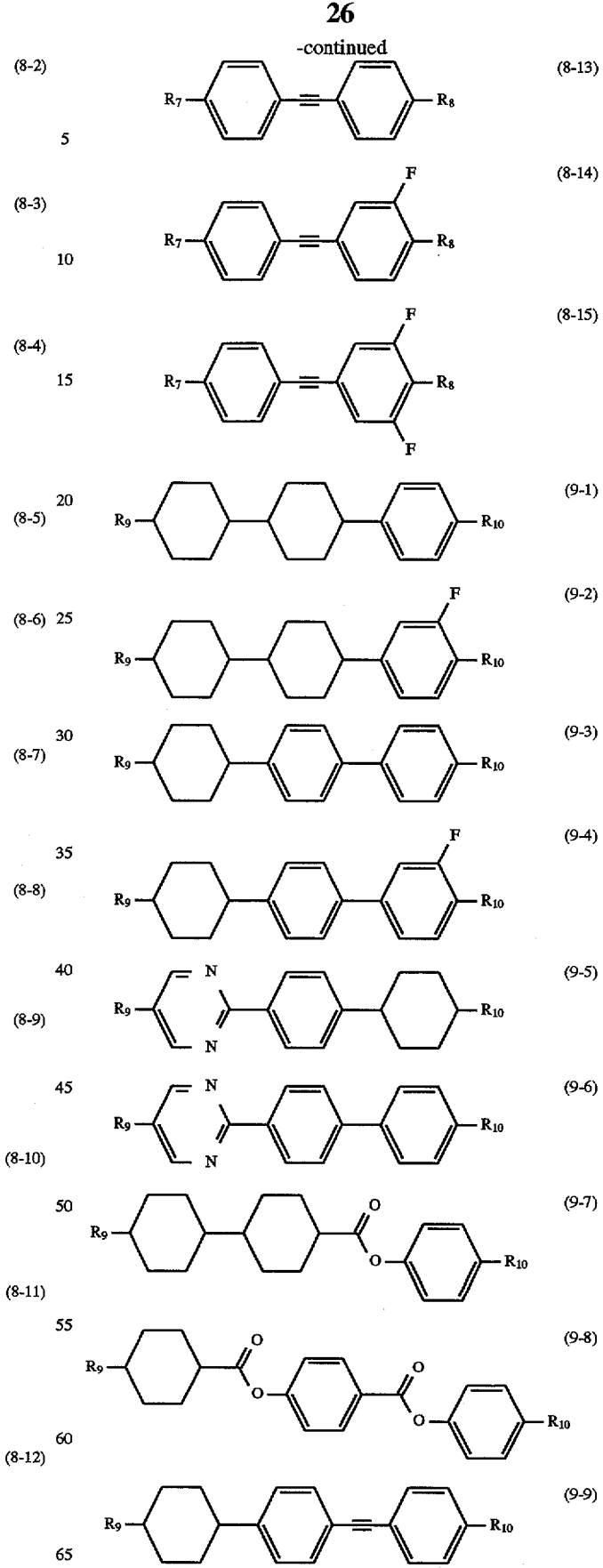

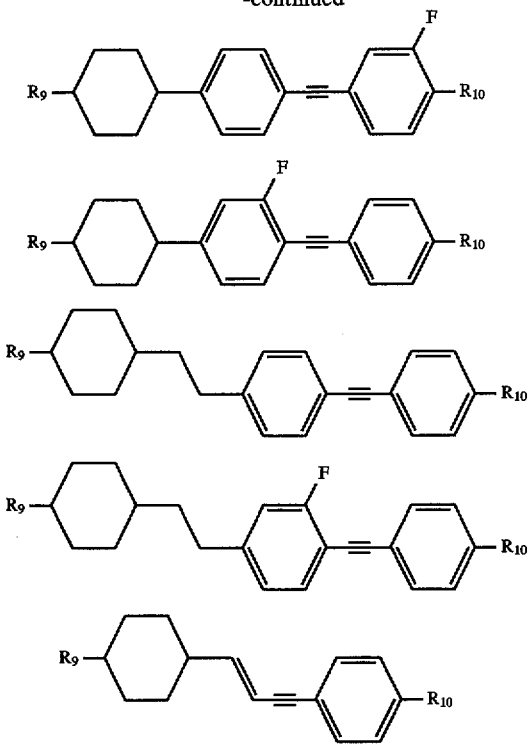

In these formulas $R_7$ and $R_8$ each independently represent an alkyl group, an alkoxy group or an alkoxymethyl group of 1 to 10 carbon atoms; $R_9$ represents an alkyl group or an alkoxy group of 1 to 10 carbon atoms; and $R_{10}$ represents an alkyl group, an alkoxy group or an alkoxymethyl group of 1 to 10 carbon atoms.

Any of the compounds expressed by the formulas (8) and (9) have a negative or weakly positive dielectric anisotropy value. The compounds of the formula (8) are used mainly for reducing the viscosity and adjusting the optical anisotropy value. The compounds of the formula (9) are used for broadening the nematic range such as elevating the clearing point, and for adjusting the optical anisotropy value.

The compounds represented by the formulas (5) to (9) are useful for preparing liquid crystal compositions for particularly STN display mode and TN display mode.

When the compounds of the formulas (5) to (9) are used for preparing liquid crystal compositions for TN display mode and STN display mode, they are used in a range of 1 to 99% by weight based upon the total weight of the liquid crystal compositions, preferably in a range of 10 to 97% by weight, more preferably in a range of 40 to 95% by weight. With such liquid crystal compositions can also be blended the compounds expressed by the formulas (2) to (4).

When the liquid crystal compositions of the present invention are used, it is possible to obtain liquid crystal display elements having improved steepness of electrooptic characteristic and improved viewing angle.

The liquid crystal compositions of the present invention are prepared according to a conventional method, e.g. a method of dissolving various components with each other at a high temperature. Further, according to the liquid crystal composition of the present invention, desired improvements can be achieved by means of suitable additives and optimized, depending upon their application. Such additives are well known by persons of ordinary skill in the art, and are disclosed in the literature in detail. For example, in order to induce the helical structure adjusting necessary twist angle and prevent reverse twist, a chiral dopant or the like is added. Further, in order to use the liquid crystal compositions of the present invention as a guest-host (GH) mode liquid crystal composition, it is possible to add a dichroic dye such as those of mellocyanine group, styryl group, azo group, azomethine group, azoxy group, quinophthallone group, anthraquinone group, tetrazine group, etc. Further, the liquid crystal compositions of the present invention can be also used as a NCAP prepared by microcapsulating nematic liquid crystals, and polymer-dispersion type liquid crystal element (PDLCD) represented by polymer network liquid crystal display element (PNLCD) obtained by introducing three-dimensional, reticulated high molecules into liquid crystals. Further, the liquid crystal compositions are also used as liquid crystal compositions for liquid crystal elements of birefringence control (ECB) mode or dynamic scattering (DS) mode.

As a nematic liquid crystal composition containing the compounds of the present invention, prepared in such manners, the following composition examples can be exemplified:

| Composition example 1 | |
|---|---|
| 4-(4-(4-propylphenyl)cyclohexyl)-1-(3-butenyl)-cyclohexene | 10% |
| 4-(4'-fluorobiphenylyl)-1-(3-butenyl)cyclohexene | 5% |
| 4-(4-trifluoromethoxyphenyl)-1-(3-butenyl)cyclohexene | 4% |
| 4-(4-heptylcyclohexyl)-1,2-difluorobenzene | 4% |
| 4-(2-(4-pentylcyclohexyl)ethyl-1,2-difluorobenzene | 5% |
| 4-(4-(4-ethylcyclohexyl)cyclohexyl)-1,2-difluorobenzene | 12% |
| 4-(4-(4-propylcyclohexyl)cyclohexyl)-1,2-difluorobenzene | 12% |
| 4-(4-(4-pentylcyclohexyl)cyclohexyl)-1,2-difluorobenzene | 12% |
| 4-(4-(2-(4-ethylcyclohexyl)ethyl)cyclohexyl)-1,2-difluorobenzene | 4% |
| 4-(4-(2-(4-propylcyclohexyl)ethyl)cyclohexyl)-1,2-difluorobenzene | 2% |
| 4-(4-(2-(4-pentylcyclohexyl)ethyl)cyclohexyl)-1,2-difluorobenzene | 4% |
| 4'-(4-ethylcyclohexyl)-3,4-difluorobiphenyl | 5% |
| 4'-(4-propylcyclohexyl)-3,4-difluorobiphenyl | 5% |
| 4'-(4-pentylcyclohexyl)-3,4-difluorobiphenyl | 10% |
| 4'-(4-ethylcyclohexyl)-4-fluorobiphenyl | 3% |
| 4-(4-(4-propylcyclohexyl)cyclohexyl)-1-fluorobenzene | 3% |
| Composition example 2 | |
| 4-(4-(3,4,5-trifluorophenyl)cyclohexyl)-1-(3-butenyl)-cyclohexene | 7% |
| 4-(4-propylcyclohexyl)-1-(3-butenyl)cyclohexene | 3% |
| 4-(4-heptylcyclohexyl)-1,2,6-trifluorobenzene | 8% |
| 4-(4-(4-propylcyclohexyl)cyclohexyl)-1,2,6-trifluorobenzene | 8% |
| 4-(4-(4-butylcyclohexyl)cyclohexyl)-1,2,6-trifluorobenzene | 5% |
| 4-(4-(2-(4-propylcyclohexyl)ethyl)cyclohexyl)-1,2,6-trifluorobenzene | 10% |
| 4-(4-(2-(4-butylcyclohexyl)ethyl)cyclohexyl)-1,2,6-trifluorobenzene | 8% |
| 4-(4-(2-(4-pentylcyclohexyl)ethyl)cyclohexyl)-1,2,6-trifluorobenzene | 10% |
| 4-(2-(4-(4-propylcyclohexyl)cyclohexyl)ethyl)-1,2,6-trifluorobenzene | 10% |
| 4-(2-(4-(4-pentylcyclohexyl)cyclohexyl)ethyl)-1,2,6-trifluorobenzene | 10% |
| 4'-(4-propylcyclohexyl)-3,4-difluorobiphenyl | 8% |
| 4'-(4-pentylcyclohexyl)-3,4-difluorobiphenyl | 8% |
| 4'-(2-(4-propylcyclohexyl)ethyl)-3,4,5-trifluorobiphenyl | 5% |

Composition example 3

| | |
|---|---|
| 4-(4-trifluoromethylphenyl)-1-(3-butenyl)cyclohexene | 6% |
| 4-(4-(3,4,5-trifluorophenyl)cyclohexyl)-1-(3-butenyl)-cyclohexene | 7% |
| 4-(4-propylcyclohexyl)-1-chlorobenzene | 4% |
| 4-(4-pentylcyclohexyl)-1-chlorobenzene | 3% |
| 4-(4-heptylcyclohexyl)-1-chlorobenzene | 4% |
| 4-(4-(4-ethylcyclohexyl)cyclohexyl)-1-chlorobenzene | 5% |
| 4-(4-(4-propylcyclohexyl)cyclohexyl)-1-chlorobenzene | 7% |
| 4-(4-(4-pentylcyclohexyl)cyclohexyl)-1-chlorobenzene | 6% |
| 4-(4-(2-(4-propylcyclohexyl)ethyl)cyclohexyl)-1-chloro-2-fluorobenzene | 3% |
| 4'-(4-ethylcyclohexyl)-3,4-difluorobiphenyl | 5% |
| 4'-(4-propylcyclohexyl)-3,4-difludrobiphenyl | 5% |
| 4'-(4-pentylcyclohexyl)-3,4-difluorobiphenyl | 10% |
| 4'-(4-propylcyclohexyl)-3,4,5-trifluorobiphenyl | 12% |
| 4'-(4-pentylcyclohexyl)-3,4,5-trifluorobiphenyl | 12% |
| 4-(2-(2-fluoro-4-(4-propylcyclohexyl)phenyl)ethynyl)-1-ethylbenzene | 4% |

Composition example 4

| | |
|---|---|
| 4-(4-propylcyclohexyl)-1-(3-butenyl)cyclohexene | 3% |
| 4-(4-(3,4,5-trifluorophenyl)cyclohexyl)-1-(3-butenyl)cyclohexene | 10% |
| 4-(4-(3,4-difluorophenyl)cyclohexyl)-1-(3-butenyl)-cyclohexene | 10% |
| 4-(2-(4-pentylcyclohexyl)ethyl)-1,2-difluorobenzene | 10% |
| 4-(4-(4-ethylcyclohexyl)cyclohexyl)-1,2-difluorobenzene | 4% |
| 4-(4-(4-propylcyclohexyl)cyclohexyl)-1,2-difluorobenzene | 4% |
| 4-(4-(4-pentylcyclohexyl)cyclohexyl)-1,2-difluorobenzene | 4% |
| 4'-(4-ethylcyclohexyl)-3,4-difluorobiphenyl | 5% |
| 4'-(4-propylcyclohexyl)-3,4-difluorobiphenyl | 5% |
| 4'-(4-pentylcyclohexyl)-3,4-difluorobiphenyl | 10% |
| 4'-(4-propylcyclohexyl)-3,4-difluorobiphenyl | 6% |
| 3,4,5-trifluoropehnyl=4-(4-propylcyclohexyl)benzoate | 8% |
| 3,4,5-trifluorophenyl=4-(4-propylcyclohexyl)cyclohexanecarboxylate | 8% |
| 3,4,5-trifluorophenyl=4-(4-pentylcyclohexyl)cyclohexanecarboxylate | 5% |
| 4-fluorophenyl=4-(4-propylcyclohexyl)benzoate | 4% |
| 4'-(4-(4-ethylcyclohexyl)cyclohexyl)-3,4,5-trifluorobiphenyl | 2% |
| 4'(2-(4-(4-propylcyclohexyl)cyclohexyl)ethyl)-3,4,5-trifluorobiphenyl | 2% |

Composition example 5

| | |
|---|---|
| 4-(4-propylcyclohexyl)-1-(3-butenyl)cyclohexene | 5% |
| 4-(4-(4-cyanophenyl)cyclohexyl)-1-(3-butenyl)-cyclohexene | 6% |
| 4-(4'-cyanobiphenylyl)-1-(3-butenyl)cyclohexene | 5% |
| 3-fluoro-4-cyanophenyl=4-propoxymethyl)benzoate | 5% |
| 4-(4-ethylcyclohexyl)benzonitrile | 6% |
| 4-(4-propylcyclohexyl)benzonitrile | 17% |
| 2-(4-fluorophenyl)-5-propylpyrimidine | 3% |
| 4-(4-(4-ethylcyclohexyl)cyclohexyl)benzonitrile | 5% |
| 4-(4-(4-propylcyclohexyl)cyclohexyl)benzonitriie | 5% |
| 2-(4'-fluorobiphenylyl)-5-propylpyrimidine | 10% |
| 4'-butyl-4-propylbicyclohexane | 7% |
| 4'-pentyl-4-propylbicyclohexane | 3% |
| 4-butoxyphenyl=4-propylcyclohexanecarboxylate | 5% |
| 4-ethoxyphenyl=4-propylcyclohexanecarboxylate | 5% |
| 4-pentoxyphenyl=4-propylcyclohexanecarboxylate | 5% |
| 4-(4-(4-propylcyclohexyl)cyclohexyl)-1-methylbenzene | 5% |
| 4-(4-(4-propylcyclohexyl)cyclohexyl)-1-methoxybenzene | 3% |

Composition example 6

| | |
|---|---|
| 4-(4-(4-cyanophenyl)cyclohexyl)-1-(3-butenyl)cyclohexene | 7% |
| 4-(4-(4-propylphenyl)cyclohexyl)-1-(3-pentenyl)cyclohexene | 8% |
| 4-(4-(3-butenyl)cyclohexyl)benzonitrile | 12% |
| 4-(4-(3-pentenyl)cyclohexyl)benzonitrile | 11% |
| 4-(4-propylcyclohexyl)benzonitrile | 8% |
| 4-(2-fluoro-4-(4-propylcyclohexyl)cyclohexyl)-benzonitriie | 3% |
| 2-(4'-fluorobiphenylyl)-5-propylpyrimidine | 5% |
| 2-(3,4-difluorophenyl)-5-propylpyrimidine | 4% |
| 2-(4-(4-propylcyclohexyl)phenyl-5-ethylpyrimidine | 5% |
| 2-(4'-propylbiphenylyl)-5-propylpyrimidine | 5% |
| 4'-butyl-4-propylbicyclohexane | 10% |
| 4'-methoxymethyl-4-propylbicyclohexane | 6% |
| 4-(2-(4-ethylphenyl)ethynyl)-1-methylbenzene | 3% |
| 4-(2-(4-hexylphenyl)ethynyl)-1-methylbenzene | 6% |
| 4-(2-(4-butylphenyl)ethynyl)-1-butylbenzene | 3% |
| 4-(4-(4-propylcyclohexyl)cyclohexyl)-1-methylbenzene | 4% |

Composition example 7

| | |
|---|---|
| 4-(4-(4-propylphenyl)cyclohexyl)-1-(3-butenyl)cyclohexene | 10% |
| 4-(4-(4-propylphenyl)cyclohexyl)-1-(3-pentenyl)cyclohexene | 10% |
| 4-(4-propylcyclohexyl)-1-(3-butenyl)cyclohexene | 5% |
| 4-(4'-biphenylyl)-1-(3-butenyl)cyclohexene | 5% |
| 3-fluoro-4-cyanophenyl=4-(ethoxylmethyl)benzoate | 5% |
| 3-fluoro-4-cyanophenyl=4-(propoxymethyl)benzoate | 10% |
| 3-fluoro-4-cyanophenyl=4-(pentoxylmethyl)benzoate | 5% |
| 3,5-difluoro-4-cyanophenyl=4-(3-pentenyl)benzoate | 15% |
| 4-(4-propylcyclohexyl)-1-ethoxybenzene | 10% |
| 4-fluorophenyl=4'-propylbicyclohexanecarboxylate | 5% |
| 4-(4-(4-propylcyclohexyl)cyclohexyl)-1-fluorobenzene | 3% |
| 4-fluorophenyl=4-(4-propylcyclohexyl)benzoate | 3% |
| 4-(2-(4-(2-(4-propylcyclohexyl)ethyl)phenyl)ethynyl)-1-ethylbenzene | 5% |
| 4-(2-(4-(2-(4-propylcyclohexyl)ethyl)phenyl)ethynyl)-1-propylbenzene | 3% |
| 4-(2-(2-fluoro-4-(4-propylcyclohexyl)phenyl)ethynyl)-1-ethylbenzene | 3% |

Composition example 8

| | |
|---|---|
| 4-(4'-cyanobiphenylyl)-1-(3-butenyl)cyclohexene | 5% |
| 4-(4'-fluorobiphenylyl)-1-(3-butenyl)cyclohexene | 5% |
| 4-(4-(4-propylphenyl)cyclohexyl)-1-(3-butenyl)cyclohexene | 5% |
| 4-(4-propylcyclohexyl)-2-fluoro-4-cyanobenzene | 3% |
| 4'-ethyl-4-cyanobiphenyl | 7% |
| 4-(4-methoxymethylcyclohexyl)benzonitrile | 10% |
| 4-(4-ethoxymethylcyclohexyl)benzonitrile | 7% |
| 4-cyanophenyl=4-ethylbenzoate | 5% |
| 2-(4-cyanophenyl)-5-propyl-1,3-dioxane | 3% |
| 4-fluorophenyl=4-propylcyclohexanecarboxylate | 3% |
| 2-(4-fluorophenyl)-5-pentylpyrimidine | 6% |
| 2-(4-ethylphenyl)-5-ethylpyrimidine | 2% |
| 2-(4-ethylphenyl)-5-propylpyrimidine | 4% |
| 2-(4-ethylphenyl)-5-butylpyrimidine | 2% |
| 2-(4'-propylcyclohexylyl)-5-ethylpyrimidine | 9% |
| 2-(4'-propylcyclohexylyl)-5-propylpyrimidine | 9% |
| 4-(4-(4-ethylcyclohexyl)cyclohexyl)-1-methylbenzene | 5% |
| 4-(4-(4-propylcyclohexyl)cyclohexyl)-1-propylbenzene | 10% |

Composition example 9

| | |
|---|---|
| 4-(4-trifluoromethoxyphenyl)-1-(3-butenyl)cyclohexene | 5% |
| 4-(4'-fluorobiphenyl)-1-(3-butenyl)cyclohexene | 5% |
| 4-(4-pentylphenyl)-1-fluorobenzene | 10% |
| 4-(4-hexylphenyl)-1-fluorobenzene | 10% |
| 4-(4-heptylphenyl)-1-fluorobenzene | 10% |
| 4-(4'-ethylbicyclohexyl)-1-trifluoromethoxybenzene | 5% |
| 4-(4'-propylbicyclohexyl)-1-trifluoromethoxybenzene | 5% |
| 4-(4'-butylbicyclohexyl)-1-trifluoromethoxybenzene | 5% |
| 4-(4'-pentylbicyclohexyl)-1-trifluoromethoxybenzene | 5% |
| 4-(2-(4'-propylbicyclohexyl)ethyl)-1-trifluoromethoxybenzene | 7% |
| 4-(2-(4'-pentylbicyclohexyl)ethyl)-1-trifluoromethoxybenzene | 7% |
| 4'-(4-propylcyclohexyl)-3,4-difluorobiphenyl | 10% |
| 4'-(4-pentylcyclohexyl)-3,4-difluorobiphenyl | 10% |
| 2'-fluoro-4'-(4-propylcyclohexyl)-4-propylbiphenyl | 3% |
| 2'-fluoro-4'-(4-pentylcyclohexyl)-4-propylbiphenyl | 3% |

Composition example 10

| | |
|---|---|
| 4-(4-(4-cyanophenyl)cyclohexyl)-1-(3-butenyl)cyclohexene | 8% |

-continued

| | |
|---|---|
| 4-(4'-cyanobiphenylyl)-1-(3-butenyl)cyclohexene | 7% |
| 4-(4-(4-propylphenyl)cyclohexyl)-1-(3-butenyl)cyclohexene | 5% |
| 3,4-difluorophenyl=4-butylcyclohexanecarboxylate | 5% |
| 3,4-difluorophenyl=4-pentylcyclohexanecarboxylate | 5% |
| 3-fluoro-4-cyanophenyl=4-ethylbenzoate | 4% |
| 3-fluoro-4-cyanophenyl=4-propylbenzoate | 4% |
| 3-fluoro-4-cyanophenyl=4-butylbenzoate | 6% |
| 3-fluoro-4-cyanophenyl=4-pentylbenzoate | 6% |
| 3,4-difluorophenyl=4'-propylbicyclohexanecarboxylate | 4% |
| 3,4-difluorophenyl=4'-pentylbicyclohexanecarboxylate | 4% |
| 3,4-difluorophenyl=4-(4-ethylcyclohexyl)benzoate | 6% |
| 3,4-difluorophenyl=4-(4-propylcyclohexyl)benzoate | 4% |
| 3,4-difluorophenyl=4-(4-butylcyclohexyl)benzoate | 6% |
| 3,4-difluorophenyl=4-(4-pentylcyclohexyl)benzoate | 4% |
| 4-(2-(4-(4-propylcyclohexyl)phenyl)ethynyl)-1-ethylbenzene | 9% |
| 4'-(3-butenyl)4-propylbicyclohexane | 4% |
| 4-(4'-(3-butenyl)bicyclohexyl)-1-methylbenzene | 3% |

The compounds expressed by the formula (1) can be easily prepared by means of usual organic synthetic procedures, as shown below.

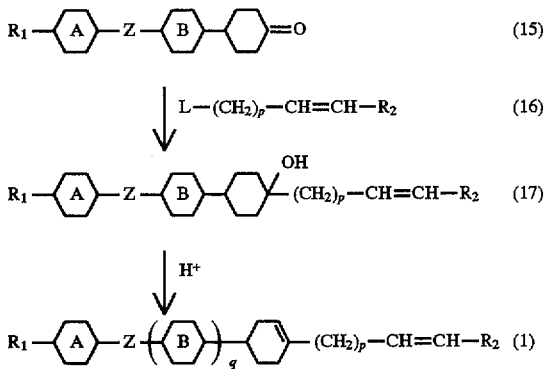

wherein L represents Li, MgBr or MgCl.

Namely, a cyclohexanone derivative (15) prepared according to a method of DE 2636684 (R. Eidenschink), U.S. Pat. No. 4,405,488 (S. Sugimori) or U.S. Pat. No. 4,820,443 (Y. Goto), is reacted with a Grignard reagent or a lithium reagent (16) prepared from a 1-halogenoalkene, to obtain an alcohol (17), followed by treating the alcohol substance (17) with p-toluenesulfonic acid or an acidic ion-exchange resin under an acidic condition, to dehydrate it, to obtain a cyclohexene substance expressed by the formula (1). The alcohol (17) is a mixture of isomers whose steric configurations of hydroxyl groups are equatorial or axial, but by deriving them into cyclohexene substance (1), they are converted into the objective compound.

EXAMPLE

The synthetic procedure and the use example of the compound of the present invention will be described in more details. In addition, in the Examples, C, N, S and I respectively represent crystal, nematic phase and isotropic phase liquid. The units of the phase transition temperatures all refer to °C.

Example 1 Preparation of 4-(4'-fluorobiphenyl-4-yl)-1-(3-butenyl) cyclohexene (in the formula (1), $R_1$ represents F atom, $R_2$ represents H atom, Z represents a single bond, rings A and B both represent 1,4-phenylene ring and p represents 2, (compound No. 45))

First step: preparation of 4-(4'-fluorobiphenyl-4-yl) cyclohexanone

A hexane solution (1.70M solution) of butyllithium was dropwise added to a mixture of 4'-fluoro-4-bromo-biphenyl (170 mmol) with tetrahydrofuran (THF) (200 mol) at −50° C. or lower over 30 minutes, followed by dropwise adding to the solution, a THF (100 ml) solution of 1,4-dioxo-spiro-[4,5]-decan-4-one (187 mmol) at −50° C. or lower, gradually returning the temperature to room temperature, stirring the mixture for 2 hours, pouring the reaction solution in a saturated aqueous solution of ammonium chloride (500 ml), extracting with ethyl acetate (500 ml), washing the organic layer with water, drying over anhydrous magnesium sulfate and distilling off the solvent, to obtain an yellow, oily adduct.

Toluene (200 ml) and p-toluenesulfonic acid (4.3 g) were added to the adduct, followed by heating the mixture under reflux, while removing the generated water, allowing to cool, washing with water, distilling off the solvent under reduced pressure, and purifying the resulting raw product subjecting to silica gel column chromatography (eluent: toluene), to obtain 1-(4'-fluorobiphenyl-4-yl)cyclohexen-4-one (160 mmol).

Ethanol (150 ml), ethyl acetate (200 ml), toluene (350 ml) and Raney Ni (20 g) were added to the above 1-(4'-fluorobiphenyl-4-yl)cyclohexen-4-one (160 mmol), followed by stirring the mixture in hydrogen atmosphere (1 atm), filtering off the catalyst after the absorption of hydrogen gas ceased (after 5 hours), distilling off the solvent under reduced pressure, purifying the resulting raw product subjecting to silica gel column chromatography (eluent: toluene/ethyl acetate (8:1), and recrystallizing from toluene, to obtain pale yellow solids, 4-(4'-fluorobiphenyl-4-yl) cyclohexanone (112 mmol), yield 65%).

Second step Preparation of the captioned compound

A THF (20 ml) solution of commercially available 4-bromo-1-butyne (27 mmol) was dropwise added to a mixture of sufficiently dried Mg (22 mmol) and THF (1.5 ml), over one hour, to prepare a Grignard reagent.

A THF (45 ml) solution of the above obtained 4-(4'-fluorobiphenyl-4-yl)cyclohexanone (22 mol) was dropwise added to the above reagent at 0° C. or lower, followed by returning the temperature to room temperature, stirring the mixture for 2 hours, adding a saturated aqueous solution of ammonium chloride (50 ml) to the reaction solution, extracting with ethyl acetate (100 ml), washing the organic layer with brine, drying over anydrous $MgSO_4$, and distilling off the solvent under reduced pressure to obtain Grignard adduct. Dissolving the Grignard adduct in toluene (50 ml), adding p-toluenesulfonic acid (1 g), heating under reflux for 1.5 hour, while removing the generated water, allowing to cool, adding a saturated aqueous solution of sodium hydrogen carbonate, washing the toluene layer with water, drying it over anhydrous magnesium sulfate, distilling off the solvent under reduced pressure, purifying the resulting raw product subjecting to silica gel column chromatography (eluent: heptane), and recrystallizing it from heptane (10 ml), to obtain the captioned compound of white powder (13 mmol, yield: 59%). This product exhibited crystallinity and its transition points were as follows:

S-N point: 89.1° C., N-I point: 106.3° C.

Further, the various spectral data well supported its structure.

MS: 306 (M+1), NMR (90 MHz) δ: 7.61–7.00 (8H, m), 6.01–5.65 (1H, m), 5.53 (1H, s), 5.03 (2H, t), 2.75 (1H, bs), 2.50–1.56 (10H, m).

Example 2

Using various cyclohexane derivatives (10) and through the synthetic route shown in Example 1, the following compounds are prepared:

Compound No. 1
  4-(4-propylcyclohexyl)-1-(3-butenyl)cyclohexene
  M.P.: 20° C. or lower, $K_{33}/K_{11}$: 2.38
Compound No. 2
  4-(4-pentylcyclohexyl)-1-(3-butenyl)cyclohexene
Compound No. 3
  4-(4-pentylcyclohexyl)-1-(3-pentenyl)cyclohexene
Compound No. 4
  4-(4-octylcyclohexyl)-1-(3-pentenyl)cyclohexene
Compound No. 5
  4-(4-pentylcyclohexyl)-1-(5-hexenyl)cyclohexene
Compound No. 6
  4-(4-propylphenyl)-1-(3-butenyl)cyclohexene
Compound No. 7
  4-(4-pentylphenyl)-1-(3-butenyl)cyclohexene
Compound No. 8
  4-(4-methoxyphenyl)-1-(3-pentenyl)cyclohexene
Compound No. 9
  4-(4-fluorophenyl)-1-(3-butenyl)cyclohexene
Compound No. 10
  4-(3,4-difluorophenyl)-1-(3-butenyl)cyclohexene
Compound No. 11
  4-(3,4,5-trifluorophenyl)-1-(3-butenyl)cyclohexene
Compound No. 12
  4-(4-cyanophenyl)-1-(3-butenyl)cyclohexene
Compound No. 13
  4-(4-chlorophenyl)-1-(3-butenyl)cyclohexene
Compound No. 14
  4-(4-trifluoromethoxyphenyl)-1-(3-butenyl)cyclohexene
  M.P.: 20° C. or lower, $K_{33}/K_{11}$: 2.46
Compound No. 15
  4-(4'-methylbicyclohexy-4-yl)-1-(3-butenyl)cyclohexene
Compound No. 16
  4-(4'-ethylbicyclohexy-4-yl)-1-(3-butenyl)cyclohexene
Compound No. 17
  4-(4'-propylbicyclohexy-4-yl)-1-(3-butenyl)cyclohexene
Compound No. 18
  4-(4'-pentylbicyclohexy-4-yl)-1-(3-butenyl)cyclohexene
Compound No. 19
  4-(4'-propylbicyclohexy-4-yl)-1-(3-pentenyl)cyclohexene
Compound No. 20
  4-(4'-propylbicyclohexy-4-yl)-1-(4-pentenyl)cyclohexene
Compound No. 21
  4-(4'-propylbicyclohexy-4-yl)-1-(5-hexenyl)cyclohexene
Compound No. 22
  4-(4'-propylbicyclohexy-4-yl)-1-(5-heptenyl)cyclohexene
Compound No. 23
  4-(4'-propylbicyclohexy-4-yl)-1-(6-heptenyl)cyclohexene
Compound No. 24
  4-(4-(4-propylphenyl)cyclohexyl)-1-(3-butenyl)cyclohexene S-I point: 126.7, $K_{33}/K_{11}$: 2.49
Compound No. 25
  4-(4-(4-propylphenyl)cyclohexyl)-1-(3-pentenyl)cyclohexene
Compound No. 26
  4-(4-(4-propylphenyl)cyclohexyl)-1(4-pentenyl)cyclohexene
Compound No. 27
  4-(4-(4-propylphenyl) cyclohexyl)-1-(5-hexenyl)cyclohexene
Compound No. 28
  4-(4-(4-propylphenyl)cyclohexyl)-1-(5-heptenyl)cyclohexene
Compound No. 29
  4-(4-(4-propylphenyl)cyclohexyl)-1-(6-heptenyl)cyclohexene
Compound No. 30
  4-(4-(4-cyanophenyl)cyclohexyl)-1-(3-butenyl)cyclohexene
Compound No. 31
  4-(4-(4-fluorophenyl)cyclohexyl)-1-(3-butenyl)cyclohexene
Compound No. 32
  4-(4-(4-chlorophenyl)cyclohexyl)-1-(3-butenyl)cyclohexene
Compound No. 33
  4-(4-(4-trifluoromethylphenyl)cyclohexyl)-1-(3-butenyl)cyclohexene
Compound No. 34
  4-(4-(4-trifluoromethoxyphenyl)cyclohexyl)-1-(3-butenyl)cyclohexene
Compound No. 35
  4-(4-(4-difluoromethoxyphenyl)cyclohexyl)-1-(3-butenyl)cyclohexene
Compound No. 36
  4-(4-(4-(1,1,2,3,3,3-hexafluoropropoxy)phenyl)-cyclohexyl)-1-(3-butenyl)cyclohexene
Compound No. 37
  4-(4-(3,4-difluorophenyl)cyclohexyl)-1-(3-butenyl)cyclohexene
Compound No. 38
  4-(4-(3,4,5-trifluorophenyl)cyclohexyl)-1-(3-butenyl)cyclohexene
Compound No. 39
  4-(4-(3-fluoro-4-cyanophenyl)cyclohexyl)-1-(3-butenyl)cyclohexene
Compound No. 40
  4-(4-(3-fluoro-4-trifluoromethoxyphenyl)cyclohexyl)-1-(3-butenyl)cyclohexene
Compound No. 41
  4-(4'-methylbiphenyl-4-yl)-1-(3-butenyl)cyclohexene
Compound No. 42
  4-(4'-ethylbiphenyl-4-yl)-1-(3-butenyl)cyclohexene
Compound No. 43
  4-(4'-propylbiphenyl-4-yl)-1-(3-butenyl)cyclohexene
Compound No. 44
  4-(4'-pentylbiphenyl-4-yl)-1-(3-butenyl)cyclohexene
Compound No. 45
  4-(4'-fluorobiphenyl-4-yl)-1-(3-butenyl)cyclohexene
  S-N point: 89.1, N-I point: 106.3, $K_{33}/K_{11}$: 2.51
Compound No. 46
  4-(3',4'-difluorobiphenyl-4-yl)-1-(3-butenyl)cyclohexene
Compound No. 47
  4-(4'-cyanobiphenyl-4-yl)-1-(3-butenyl)cyclohexene
Compound No. 48
  4-(4'-trifluoromethoxybiphenyl-4-yl)-1-(3-butenyl)cyclohexene
Compound No. 49
  4-(3'-fluoro-4'-cyanobiphenyl-4-yl)-1-(3-butenyl)cyclohexene Compound No. 50
  4-(4'-methylbiphenyl-4-yl)-1-(3-pentenyl)cyclohexene
Compound No. 51
  4-(4'-ethylbiphenyl-4-yl)-1-(3-pentenyl)cyclohexene
Compound No. 52
  4-(4'-propylbiphenyl-4-yl)-1-(3-pentenyl)cyclohexene
Compound No. 53
  4-(4'-pentylbiphenyl-4-yl)-1-(3-pentenyl)cyclohexene
Compound No. 54
  4-(4'-fluorobiphenyl-4-yl)-1-(3-pentenyl)cyclohexene
Compound No. 55
  4-(3',4'-difluorobiphenyl-4-yl)-1-(3-pentenyl)cyclohexene
Compound No. 56
  4-(4'-cyanobiphenyl-4-yl)-1-(3-pentenyl)cyclohexene
Compound No. 57
  4-(4'-trifluoromethoxybiphenyl-4-yl)-1-(5-hexenyl)cyclohexene
Compound No. 58
  4-(3'-fluoro-4'-cyanobiphenyl-4-yl)-1-(6-heptenyl)cyclohexene
Compound No. 59
  4-(4-(2-(4-propylcyclohexyl)ethyl)cyclohexyl)-1-(3-butenyl)cyclohexene
Compound No. 60
  4-(4-(2-(4-propylcyclohexyl)ethyl)cyclohexyl)1-(3-pentenyl)cyclohexene
Compound No. 61
  4-(4-(2-(4-propylcyclohexyl)ethyl)cyclohexyl)-1-(4-pentenyl)cyclohexene
Compound No. 62
  4-(4-(2-(4-pentylcyclohexyl)ethyl)cyclohexyl)-1-(5-hexenyl)cyclohexene
Compound No. 63
  4-(4-(2-(4-propylphenyl)ethyl)cyclohexyl)-1-(3-butenyl)cyclohexene
Compound No. 64
  4-(4-(2-(4-propylphenyl)ethyl)cyclohexyl)-1-(3-pentenyl)cyclohexene
Compound No. 65
  4-(4-(2-(4-propylphenyl)ethyl)cyclohexyl)-1-(4-pentenyl)cyclohexene
Compound No. 66
  4-(4-(2-(4-pentylphenyl)ethyl)cyclohexyl)-1-(3-butenyl)cyclohexene
Compound No. 67
  4-(4-(2-(4-pentylphenyl)ethyl)cyclohexyl)-1-(3-pentenyl)cyclohexene
Compound No. 68
  4-(4-(2-(4-fluorophenyl)ethyl)cyclohexyl)-1-(3-butenyl)cyclohexene
Compound No. 69
  4-(4-(2-(3,4-difluorophenyl)ethyl)cyclohexyl)-1(3-butenyl)cyclohexene
Compound No. 70
  4-(4-(2-(4-cyanophenyl)ethyl)cyclohexyl)-1-(3-butenyl)cyclohexene
Compound No. 71
  4-(4-(2-(4-trifluoromethylphenyl)ethyl)cyclohexyl)-1-(3-butenyl)cyclohexene
Compound No. 72
  4-(4-(2-(4-trifluoromethoxyphenyl)ethyl)cyclohexyl)-1-(3-butenyl)cyclohexene
Compound No. 73
  4-(4-(2-(3-fluoro-4-chlorophenyl)ethyl)cyclohexyl)-1-(3-butenyl)cyclohexene
Compound No. 74
  4-(4-(2-(4-propylphenyl)ethyl)phenyl)-1-(3-butenyl)cyclohexene
Compound No. 75
  4-(4-(2-(4-pentylphenyl)ethyl)phenyl)-1-(3-butenyl)cyclohexene
Compound No. 76
  4-(4-(2-(4-fluorophenyl)ethyl)phenyl)-1-(3-butenyl)cyclohexene
Compound No. 77
  4-(4-(2-(4-fluorophenyl)ethyl)phenyl)-1-(3-pentenyl)cyclohexene
Compound No. 78
  4-(4-(2-(3,4-difluorophenyl)ethyl)phenyl)-1-(3-butenyl)cyclohexene
Compound No. 79
  4-(4-(2-(3,4-difluorophenyl)ethyl)phenyl)-1-(5-hexenyl)cyclohexene
Compound No. 80
  4-(4-(2-(4-cyanophenyl)ethyl)phenyl)-1-(3-butenyl)cyclohexene
Compound No. 81
  4-(4-(2-(4-cyanophenyl)ethyl)phenyl)-1-(3-pentenyl)cyclohexene
Compound No. 82
  4-(4-(2-(4-cyanophenyl)ethyl)phenyl)-1-(5-hexenyl)cyclohexene
Compound No. 83
  4-(4-(2-(4-cyanophenyl)ethyl)phenyl)-1-(5-heptenyl)cyclohexene
Compound No. 84
  4-(4-(2-(4-cyanophenyl)ethyl)phenyl)-1-(6-heptenyl)cyclohexene
Compound No. 85
  4-(4-(2-(4-chlorophenyl)ethyl)phenyl)-1-(3-butenyl)cyclohexene
Compound No. 86
  4-(4-(2-(4-trifluoromethoxyphenyl)ethyl)phenyl)-1-(3-butenyl)cyclohexene
Compound No. 87
  4-(4'-(4-methylcyclohexyl)biphenyl-4-yl)-1-(3-butenyl)cyclohexene
Compound No. 88
  4-(4'-(4-ethylcyclohexyl)biphenyl-4-yl)-1-(3-butenyl)cyclohexene
Compound No. 89
  4-(4'-(4-propylcyclohexyl)biphenyl-yl)-1-(3-butenyl)cyclohexene
Compound No. 90
  4-(4'-(4-propylcyclohexyl)biphenyl-4-yl)-1-(3-butenyl)-2-fluorocyclohexene
Compound No. 91
  4-(2'-fluoro-4'-(4-propylcyclohexyl)biphenyl-4-yl)-1-(3-butenyl)cyclohexene
Compound No. 92
  4-(4'-(4-propylcyclohexyl)biphenyl-4-yl)-1-(3-pentenyl)cyclohexene
Compound No. 93
  4-(4'-(4-propylcyclohexyl)biphenyl-4-yl)-1-(4-pentenyl)cyclohexene Compound No. 94
  4-(4'-(4-butylcyclohexyl)biphenyl-4-yl)-1-(3-butenyl) cyclohexene
Compound No. 95
  4-(4'-(4-pentylcyclohexyl)biphenyl-4-yl)-1-(3-butenyl) cyclohexene
Compound No. 96
  4-(4'-(4-pentylcyclohexyl)biphenyl-4-yl)-1-(3-pentenyl) cyclohexene
Compound No. 97
  4-(4'-(4-pentylcyclohexyl)biphenyl-4-yl)-1-(4-pentenyl) cyclohexene
Compound No. 98
  4-(4'-(4-hexylcyclohexyl)biphenyl-4-yl)-1-(3-butenyl) cyclohexene
Compound No. 99
  4-(4'-(4-hexylcyclohexyl)biphenyl-4-yl)-1-(5-hexenyl) cyclohexene
Compound No. 100
  4-(4-(4'-propylbiphenyl-4-yl)cyclohexyl)-1-(3-butenyl) cyclohexene
Compound No. 101
  4-(4'-propylbiphenyl-4-yl)cyclohexyl)-1-(3-pentenyl) cyclohexene
Compound No. 102
  4-(4-(4'-propylbiphenyl-4-yl)cyclohexyl)-1-(4-pentenyl) cyclohexene
Compound No. 103
  4-(4-(4'-pentylbiphenyl-4-yl)cyclohexyl)-1-(3-butenyl) cyclohexene
Compound No. 104
  4-(4-(4'-pentylbiphenyl -4-yl)cyclohexyl)-1-(3-pentenyl) cyclohexene
Compound No. 105
  4-(4-(4'-pentylbiphenyl-4-yl)cyclohexyl)-1-(4-pentenyl) cyclohexene
Compound No. 106
  4-(4-(4'-fluorobiphenyl-4-yl)cyclohexyl)-1-(3-butenyl) cyclohexene
Compound No. 107
  4-(4-(3',4'-difluorobiphenyl-4-yl)cyclohexyl)-1-3-butenyl)cyclohexene
Compound No. 108
  4-(4-(3',4',5'-trifluorobiphenyl-4-yl)cyclohexyl)-1-(3-butenyl)cyclohexene
Compound No. 109
  4-(4-(4'-cyanobiphenyl-4-yl)cyclohexyl)-1-(3-butenyl) cyclohexene
Compound No. 110
  4-(4-(4'-trifluoromethylbiphenyl-4-yl)cyclohexyl)-1-(3-butenyl)cyclohexene
Compound No. 111
  4-(4-(4'-(1,1,2,3,3,3-hexafluoropropoxy)biphenyl-4-yl) cyclohexyl)-1-(3-butenyl)cyclohexene Example 3 (Use example 1)

A nematic liquid crystal composition B1 consisting of

| | |
|---|---|
| 4-(4-propylcyclohexyl)benzonitrile | 24%, |
| 4-(4-pentylcyclohexyl)benzonitrile | 36%, |

-continued

| | |
|---|---|
| 4-(4-heptylcyclohexyl)benzonitrile | 25% and |
| 4-(4-pentylphenyl)benzonitrile | 15%, | was prepared. This liquid crystal composition B1 exhibited a clearing point of 72.4° C., a threshold voltage of 1.78V in a cell thickness of 9 μm, a dielectric anisotropy value of 11.0, an optical anisotropy value of 0.137 and a viscosity at 20° C. of 27.0 mPa.s. A liquid crystal composition A1 consisting of the above liquid crystal composition B1 (85 parts) and a compound of the present invention obtained in Example 2, 4-(4-propylcyclohexyl)-1-(3-butenyl) cyclohexene (Compound No. 1)(15 parts) was prepared. This liquid crystal composition A1 exhibited a clearing point of 61.5° C., a threshold voltage of 1.65V in a thickness of 8.9 μm, a dielectric anisotropy value of 9.4, an optical anisotropy value of 0.117, a viscosity at 20° C. of 22.0 mPa.s and an elastic constant ratio $K_{33}/K_{11}$ of 2.38. Further, when this composition was allowed to stand for 60 days in a freezer of −20° C., no deposition of crystal was observed.

In addition, the values of physical properties of 4-(4-propylcyclohexyl)-1-(3-butenyl)cyclohexene calculated from the mixing ratios of the liquid crystal composition A1 according to extraporation method, were as follows:

Clearing point: 65.1° C., dielectric anisotropy value: −1.0, optical anisotropy value: 0.037; and viscosity: −12.3 mpa·s.

Example 4 (Use example 2)

A liquid crystal composition A2 consisting of the liquid crystal composition B1 prepared in Example 3 (85 parts by weight), and a compound of the present invention obtained in Example 2, 4-(4-trifluoromethoxy-phenyl)-1-(3-butenyl) cyclohexene (Compound No. 14) (15 parts by weight)was prepared. This composition A2 exhibited the following values of physical properties:

Clearing point: 48.8° C., threshold voltage: 1.42V in a cell thickness of 8.8 μm, dielectric anisotropy value: 9.8, optical anisotropy value: 0.118, viscosity at 20° C.: 22.4 mpa·s, and elastic constant ratio $K_{33}/K_{11}$: 2.46. Further, when this composition A2 was allowed to stand for 60 days in a freezer of −20° C., no deposition of crystal was observed.

In addition, the values of physical properties of 4-(4-trifluoromethoxypheyl)-1-(3-butenyl)cyclohexene (Compound No. 14), calculated from the mixing ratio of the liquid crystal composition A2 according to extrapolation method were as follows:

Clearing point: −84.9° C., dielectric anisotropy value: 3.0, optical anisotropy value: 0.010, and viscosity: −3.7 mpa·s.

Example 5 (Use example 3)

A nematic liquid crystal B2 consisting of

| | |
|---|---|
| 4-(4-propylcyclohexyl)benzonitrile | 30% |
| 4-(4-pentylcyclohexyl)benzonitrile | 40% and |
| 4-(4-heptylcyclohexyl)benzonitrile | 30%, | was prepared.

The values of physical properties of this liquid crystal composition B2 were as follows:

Clearing point: 52.3° C., threshold voltage: 1.60V in a cell thickness of 9 μm, dielectric anisotropical value: 10.7, optical anisotropy value: 0.119, and viscosity at 20° C. of 21.7 mpa·s.

A liquid crystal composition A3 consisting of this liquid crystal composition B2 (85 parts by weight) and the compound of the present invention obtained in Example 2, 4-(4-(4-propylphenyl)cyclohexyl)-1-(3-butenyl) cyclohexene (Compound No. 24) (15 parts by weight), was prepared. The values of physical properties of this composition A3 were as follows:

Clearing point: 57.8° C., threshold voltage: 1.58V in a cell thickness of 8.9 μm, dielectric anisotropy value: 9.6; optical anisotropy value: 0.116, viscosity at 20° C. of 20.9 mpa·s; and elastic constant ratio $K_{33}/K_{11}$: 2.49. Further, when this composition A3 was allowed to stand for 60 days in a freezer of −20° C., no deposition of crystal was observed.

In addition, the values of physical properties of 4-(4-(4-propylphenyl)cyclohexyl)-1-(3-butenyl)cyclohexene (Compound No. 24) calculated from the mixing ratio of this liquid crystal composition A3 according to extrapolation method, were as follows:

Clearing point: 89.0° C., dielectric anisotropy value: 3.4, optical anisotropy value: 0.099, and viscosity at 20° C.: 16.4 mpa·s.

Example 6 (Use example 4)

A liquid crystal composition A4 consisting of the liquid composition B2 prepared in Example 5 (85 parts by weight) and the compound of the present invention obtained in Example 1,4-(4'-fluorobiphenyl-4-yl)-1-(3-butenyl) cyclohexene (compound No. 45) (15 parts by weight), was prepared. The values of the physical properties of this composition A4 were as follows:

Clearing point: 54.7, threshold voltage: 1.51V in a cell thickness of 8.8 μm, dielectric anisotropy value: 10.0, optical anisotropy value: 0.124, viscosity at 20° C. of 20.9 mpa·s, and elastic constant ratio, $K_{33}/K_{11}$: 2.51.

Further, when this composition A4 was allowed to stand for 60 days in a freezer of −20° C., no deposition of crystal was observed.

In addition, the values of physical properties of 4-(4'-fluorobiphenyl-4-yl)-1-(3-butenyl)cyclohexene (Compound No. 45) calculated from the mixing ratio of this liquid crystal composition A4 according to extraporation method, were as follows:

Clearing point: 68.3° C., dielectric anisotropy value: 6.0, optical anisotropy value: 0.152, and viscosity at 20° C.: 19.7 mpas.

Example 7 (Comparative example 1)

A liquid crystal composition A5 consisting of the liquid crystal composition B2 prepared in Example 5 (85 parts by weight) and a compound expressed by the formula (14) disclosed in Japanese patent application laid-open No. Hei 6-151447

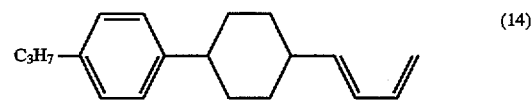

(15 parts by weight) was prepared. This liquid crystal composition A5 and the A1 prepared in Example 3 were respectively heated at 100° C. for 2 hours, to observe change in the clearing points.

The clearing point of the liquid crystal composition A5 which was 62.8° C. before the heating, lowered down to 55.1° C., that is, the reduction was 7.7° C. Whereas, the clearing point of the liquid crystal composition A1 which was 61.5° C. before the heating lowered down to 61.2° C., that is, the reduction was on16 0.3° C. Thus, it was found that the compound expressed by the formula (1) was very stable.

Further, compositions shown in the following Examples (Use examples) were prepared (wherein the abbreviations were denoted in the following rules):

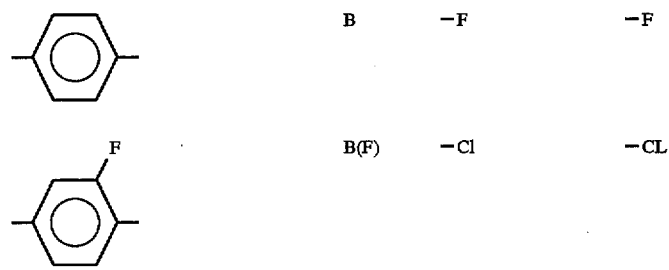

| Left terminal group | Symbol | Bonding group | Symbol |
|---|---|---|---|
| $C_aH_{2a+1}-$ | a— | $-CH_2CH_2-$ | 2 |
| $C_aH_{2a+1}O-$ | aO— | $-COO-$ | E |
| $C_aH_{2a+1}OC_bH_{2b}-$ | aOb— | $-C\equiv C-$ | T |
| $C_2=CHC_aH_{2a}-$ | Va— | $-CH=CH-$ | V |
| $C_aH_{2a+1}CH=CHC_bH_{2b}-$ | aVb— | $-CF_2O-$ | CF2O |
| $C_aH_{2a+1}CH=CHC_bH_{2b}CH=CHC_dH_{2d}-$ | aVbVd— | | |

| Ring structure | Symbol | Right terminal group | Symbol |
|---|---|---|---|
| (phenyl) | B | —F | —F |
| (fluoro-phenyl) | B(F) | —Cl | —CL |

-continued

| Structure | Symbol | Group | Abbrev |
|---|---|---|---|
| 2,5-difluorophenylene (F at 1,4 positions as shown) | B(F,F) | —CN | —C |
| cyclohexylene | H | —CF$_3$ | —CF3 |
| pyrimidine (N,N) | Py | —OCF$_3$ | —OCF3 |
| dioxane (O,O) | D | —OCF$_2$H | —OCF2H |
| cyclohexenylene | Ch | —C$_w$H$_{2w-1}$ | —w |
| | | —OC$_w$H$_{2w+1}$ | —Ow |
| | | —COOCH$_3$ | —EMe |

Example 8 (Use example 5)

| Component | % |
|---|---|
| V2-ChHB-3 (Compound No. 24) | 7.0% |
| V2-HB-C | 11.0% |
| 1V2-HB-C | 10.0% |
| 101-HB-C | 10.0% |
| 2-HB-C | 5.0% |
| 3-HB-C | 5.0% |
| 3-HH-4 | 11.0% |
| 2-BTB-01 | 4.2% |
| 3-BTB-01 | 4.2% |
| 4-BTB-01 | 4.2% |
| 4-BTB-02 | 4.2% |
| 5-BTB-01 | 4.2% |
| 2-HHB-C | 10.0% |
| 3-HHB-C | 10.0% |

$T_{NI}$ = 82.0 [°C.]
$\eta$ = 21.2 [mPa.s]
$\Delta n$ = 0.151
$\Delta \epsilon$ = 9.3
$V_{th}$ = 1.76 [V]

Example 9 (Use example 6)

| Component | % |
|---|---|
| V2-ChH-3 (Compound No. 1) | 4.0% |
| V2-ChHB-3 (Compound No. 24) | 10.0% |
| 1V2-BEB (F, F)-C | 8.0% |
| 3-HB-C | 24.0% |
| 3-HH-4 | 8.0% |
| 3-HH-5 | 8.0% |
| 3-HHB-1 | 10.0% |
| 3-HHB-3 | 7.0% |
| 3-HB (F) TB-2 | 5.0% |
| 3-HB (F) TB-3 | 4.0% |
| 3-H2BTB-2 | 6.0% |
| 3-H2BTB-3 | 6.0% |

$T_{NI}$ = 95.2 [°C.]
$\eta$ = 23.0 [mPa.s]
$\Delta n$ = 0.131
$\Delta \epsilon$ = 8.2
$V_{th}$ = 2.02 [V]

Example 10 (Use example 7)

| Component | % |
|---|---|
| V2-ChHB-3 (Compound No. 24) | 10.0% |
| 2-HB (F)-C | 10.0% |
| 3-HB (F)-C | 10.0% |
| 301-BEB (F)-C | 5.0% |
| 1V-HB-C | 5.0% |
| 3-HB-02 | 10.0% |
| V2-HH-3 | 5.0% |
| V-HH-4 | 5.0% |
| 2-BTB-01 | 10.0% |
| V-HHB-1 | 10.0% |
| 1V2-HBB-2 | 5.0% |
| 3-HHB-F | 5.0% |
| 3-H2BTB-2 | 5.0% |
| 3-H2BTB-3 | 5.0% |

$T_{NI}$ = 67.1 [°C.]
$\eta$ 16.1 [mPa.s]
$\Delta n$ = 0.129
$\Delta \epsilon$ = 7.0
$V_{th}$ = 1.65 [V]

Example 11 (Use example 8)

| Component | % |
|---|---|
| V2-ChHB-3 (Compound No. 24) | 5.0% |
| V2-ChBB-F (Compound No. 45) | 5.0% |
| 1V2-BEB (F, F)-C | 5.0% |
| 3-HB-C | 25.0% |
| 1-BTB-3 | 5.0% |
| 2-BTB-1 | 10.0% |
| 3-HH-4 | 11.0% |
| 3-HHB-1 | 10.0% |
| 3-H2BTB-2 | 4.0% |
| 3-H2BTB-3 | 4.0% |
| 3-H2BTB-4 | 4.0% |
| 3-HB (F) TB-2 | 6.0% |
| 3-HB (F) TB-3 | 6.0% |

$T_{NI}$ = 91.8 [°C.]
$\eta$ 15.3 [mPa.s]
$\Delta n$ = 0.162
$\Delta \epsilon$ 7.2
$V_{th}$ = 2.08 [V]

Example 12 (Use example 9)

| | |
|---|---|
| V2-ChHB-3 (Compound No. 24) | 10.0% |
| 2-BB-C | 8.0% |
| 4-BB-C | 6.0% |
| 2-HB-C | 10.0% |
| 3-HB-C | 13.0% |
| 5-PyB-F | 6.0% |
| 2-BTB-01 | 2.0% |
| 2-HHB-1 | 6.0% |
| 3-HHB-1 | 8.0% |
| 3-HHB-01 | 5.0% |
| 3-HHB-F | 5.0% |
| 2-HHB-C | 4.0% |
| 3-HHB-C | 6.0% |
| 3-PyBB-F | 6.0% |
| 3-HEBEB-F | 3.0% |
| 3-HEBEB-1 | 2.0% |

$T_{NI} = 94.4$ [°C.]
$\eta = 24.6$ [mPa.s]
$\Delta n = 0.146$
$\Delta\epsilon = 8.9$
$V_{th} = 1.87$ [V]

Example 13 (Use example 10)

| | |
|---|---|
| V2-ChHB-3 (Compound No. 24) | 10.0% |
| 3-HB (F)-C | 10.0% |
| 5-HB (F)-C | 5.0% |
| 2-HHB (F)-C | 7.0% |
| 3-HHB (F)-C | 7.0% |
| 2-BEB-C | 7.0% |
| 2-BTB-1 | 5.0% |
| 3-HH-4 | 10.0% |
| 101-HH-5 | 5.0% |
| 3-HH-EMe | 5.0% |
| 5-PyB (F)-F | 10.0% |
| 3-PyBB-F | 5.0% |
| 4-PyBB-F | 5.0% |
| 7-HEB-F | 3.0% |
| 5-HHEB-F | 3.0% |
| 3-HBEB-F | 3.0% |

$T_{NI} = 70.2$ [°C.]
$\eta = 21.7$ [mPa.s]
$\Delta n = 0.119$
$\Delta\epsilon = 11.9$
$V_{th} = 1.42$ [V]

Example 14 (Use example 11)

| | |
|---|---|
| V2-ChH-3 (Compound No. 1) | 6.0% |
| V2-ChHB-3 (Compound No. 24) | 5.0% |
| 3-HB-C | 5.0% |
| 2-BB-C | 10.0% |
| 3-HHEBB-C | 2.0% |
| 3-HBEBB-C | 2.0% |
| 3-HB-02 | 10.0% |
| 2-PyB-2 | 8.3% |
| 3-PyB-2 | 8.3% |
| 4-PyB-2 | 8.4% |
| 2-PyB-02 | 3.0% |
| 3-HHB-3 | 4.0% |
| 3-HHB-1 | 5.0% |
| 3-PyB-H-2 | 7.0% |
| 2-PyBH-3 | 7.0% |
| 4-PyBB-2 | 5.0% |
| 6-PyBB-2 | 4.0% |

$T_{NI} = 70.9$ [°C.]
$\eta = 18.7$ [mPa.s]
$\Delta n = 0.152$
$\Delta\epsilon = 4.9$
$V_{th} = 2.15$ [V]

Example 15 (Use example 12)

| | |
|---|---|
| V2-ChBB-F (Compound No. 45) | 4.0% |
| V2-ChHB-3 (Compound No. 24) | 4.0% |
| 5-PyB (F)-F | 10.0% |
| 3-DB-C | 10.0% |
| 4-DB-C | 12.0% |
| 5-DB-C | 8.0% |
| 2-BEB-C | 10.0% |
| 3-HEB-04 | 3.2% |
| 4-HEB-02 | 2.5% |
| 5-HEB-01 | 2.5% |
| 3-HEB-02 | 2.0% |
| 5-HEB-02 | 1.6% |
| 4-HEB-04 | 3.2% |
| 10-BEB-2 | 3.0% |
| 5-HEB-1 | 3.0% |
| 3-HHB-3 | 10.0% |
| 2-PyBH-3 | 6.0% |
| 3-HB (F) VB-2 | 5.0% |

$T_{NI} = 64.1$ [°C.]
$\eta = 30.5$ [mPa.s]
$\Delta n = 0.124$
$\Delta\epsilon = 14.3$
$V_{th} = 1.30$ [V]

Example 16 (Use example 13)

| | |
|---|---|
| V2-ChB-OCF3 (Compound No. 14) | 4.0% |
| V2-ChBB-F (Compound No. 45) | 6.0% |
| 3-HB-02 | 4.0% |
| 7-HB (F)-F | 3.0% |
| 2-HHB (F)-F | 10.0% |
| 3-HHB (F)-F | 10.0% |
| 5-HHB (F)-F | 10.0% |
| 2-HBB (F)-F | 8.5% |
| 3-HBB (F)-F | 8.5% |
| 5-HBB (F)-F | 17.0% |
| 3-HBB-F | 5.0% |
| 3-HBB (F, F)-F | 5.0% |
| 5-HBB (F, F)-F | 9.0% |

$T_{NI} = 77.6$ [°C.]
$\eta = 24.0$ [mPa.s]
$\Delta n = 0.114$
$\Delta\epsilon = 5.8$
$V_{th} = 1.99$ [V]

Example 17 (Use example 14)

| | |
|---|---|
| V2-ChB-OCF3 (Compound No. 14) | 5.0% |
| 7-HB-F | 6.0% |
| 2-HHB-OCF3 | 12.0% |
| 5-HHB-OCF3 | 8.0% |
| 2-H2HB-OCF3 | 5.0% |
| 5-H2HB-OCF3 | 5.0% |
| 3-HH2B (F)-F | 10.0% |
| 5-HH2B (F)-F | 10.0% |
| 3-H2HB (F, F)-F | 6.0% |
| 4-H2HB (F, F)-F | 5.0% |
| 5-H2HB (F, F)-F | 5.0% |
| 3-HBB (F, F)-F | 8.0% |
| 3-HH2B (F, F)-F | 8.0% |
| 5-HH2B (F, F)-F | 7.0% |

$T_{NI} = 83.7$ [°C.]
$\eta = 20.1$ [mPa.s]
$\Delta n = 0.077$
$\Delta\epsilon = 5.5$
$V_{th} = 2.08$ [V]

Effectiveness of the Invention

The compounds of the present invention expressed by the formula (1) have a very high elastic constant ratio $K_{33}/K_{11}$ and a low temperature miscibility and chemical stability, sufficient for liquid crystal compositions to be practically used.

When the compounds of the formula (1) of the present invention having the above superior characteristic properties are used, liquid crystal compositions having a steep electrooptical characteristic and a high stability are obtained.

What we claim is:

1. A liquid crystalline compound expressed by the formula (1)

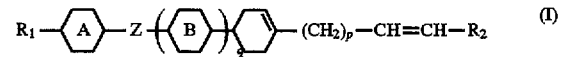

wherein $R_1$ represents an alkyl group or an alkoxy group of 1 to 10 carbon atoms, a halogenated alkyl group or a halogenated alkoxy group of 1 to 4 carbon atoms, a halogen atom or cyano group; $R_2$ represents hydrogen atom or an alkyl group of 1 to 3 carbon atoms; rings A and B each independently represent 1,4-phenylene ring or trans-1,4-cyclohexylene ring wherein hydrogen atom(s) may be replaced by halogen atom(s); Z represents a single bond, 1,4-phenylene ring, trans-1,4-cyclohexylene ring or 1,2-ethylene group; p represents an integer of 2 to 4; and q represents 0 or 1.

2. A liquid crystalline compound according to claim 1, wherein p represents 2 and $R_2$ represents hydrogen atom.

3. A liquid crystal composition comprising at least two components, which composition contains at least one liquid crystalline compound expressed by the formula (1) of claim 1.

4. A liquid crystal composition comprising as a first component, at least one liquid crystalline compound expressed by the formula (1) of claim 1, and as a second component, at least one member selected from the group consisting of compounds expressed by the formulas (2), (3) and (4):

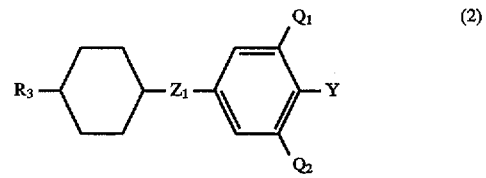

(2)

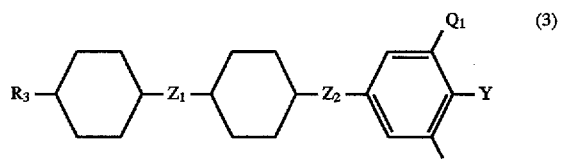

(3)

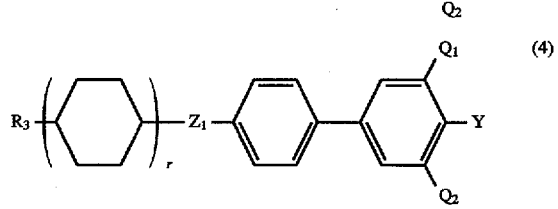

(4)

wherein $R_3$ represents an alkyl group of 1 to 10 carbon atoms; y represents F atom, Cl atom, —$CF_3$, —$OCF_3$— or $OCF_2H$; $Q_1$ and $Q_2$ each independently represent H atom or F atom; r represents 1 or 2; and $Z_1$ and $Z_2$ each independently represent —$CH_2CH_2$— or a single bond.

5. A liquid crystal composition comprising as a first component, at least one liquid crystalline compound expressed by the formula (1) of claim 1, and as a second component, at least one member selected from the group consisting of compounds expressed by the formulas (5), (6), (7), (8) and (9):

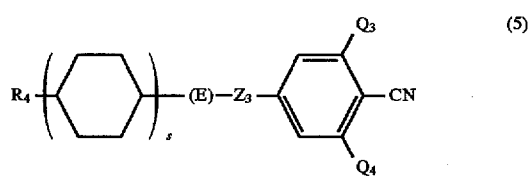

(5)

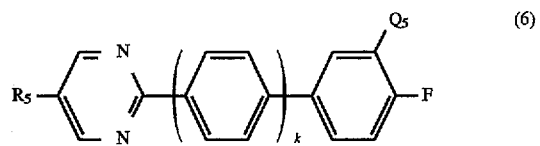

(6)

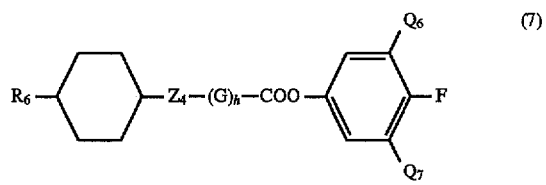

(7)

(8)

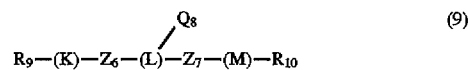

(9)

wherein $R_4$ represents an alkyl group of 1 to 10 carbon atoms, wherein one or more methylene groups (—$CH_2$—) may each be replaced by O atom (—O—), but two or more methylene groups are not successively replaced by O atom; $Z_3$ represents —$CH_2CH_2$—, —COO— or a single bond; $Q_3$ and $Q_4$ each independently represent H atom or F atom; (E) represents cyclohexane ring, benzene ring or 1,3-dioxane ring; s represents 0 or 1; $R_5$ represents an alkyl group of 1 to 10 carbon atoms; $Q_5$ represents H atom or F atom; k represents 0 or 1; $R_6$ represents an alkyl group of 1 to 10 carbon atoms; (G) represents cyclohexane ring or benzene ring; $Q_6$ and $Q_7$ each independently represent H atom or F atom; $Z_4$ represents —COO— or a single bond; h represents 0 or 1; $R_7$ and $R_8$ each independently represent an alkyl group, an alkoxy group or an alkoxymethyl group each of 1 to 10 carbon atoms; (H) represents cyclohexane ring, pyrimidine ring or benzene ring; (J) represents cyclohexane ring or benzene ring; $Z_5$ represents —C≡C—, —COO—, —$CH_2CH_2$— or a single bond; $R_9$ represents an alkyl group or an alkoxy group of 1 to 10 carbon atoms; $R_{10}$ represents an alkyl group, an alkoxy group or an alkoxymethyl group of 1 to 10 carbon atoms; (K) represents cyclohexane ring or pyrimidine ring; (L) and (M) each independently represent cyclohexane ring or benzene ring; $Z_6$ represents —COO—, —$CH_2CH_2$— or a single bond; $Z_7$ represents —C≡C—, —COO— or a single bond; and $Q_8$ represents H atom or F atom.

6. A liquid crystal display element which comprises a liquid crystal composition comprising at least two components at least one of which is at least one liquid crystalline compound expressed by the formula (1) set forth in claim 1.

7. A liquid crystal display element which comprises a liquid crystal composition set forth in any one of the claims 3 to 5.

* * * * *